US008512190B2

(12) United States Patent
De Mazière

(10) Patent No.: US 8,512,190 B2
(45) Date of Patent: Aug. 20, 2013

(54) REVERSIBLE VARIABLE TRANSMISSION-RVT

(75) Inventor: Filip De Mazière, Heusden (BE)

(73) Assignee: Mazaro NV, Destelbergen (BE)

(*) Notice: Subject to any disclaimer, the term of this patent is extended or adjusted under 35 U.S.C. 154(b) by 319 days.

(21) Appl. No.: 12/995,310

(22) PCT Filed: Jun. 5, 2008

(86) PCT No.: PCT/EP2008/057009
§ 371 (c)(1),
(2), (4) Date: Nov. 30, 2010

(87) PCT Pub. No.: WO2009/146748
PCT Pub. Date: Dec. 10, 2009

(65) Prior Publication Data
US 2011/0118071 A1 May 19, 2011

(51) Int. Cl.
F16H 13/06 (2006.01)
(52) U.S. Cl.
USPC .......................................... 475/114
(58) Field of Classification Search
USPC .................. 475/114, 115, 192, 197
See application file for complete search history.

(56) References Cited

U.S. PATENT DOCUMENTS

| 1,856,383 | A | | 5/1932 | Gerdes | |
|---|---|---|---|---|---|
| 4,296,647 | A | * | 10/1981 | Kemper | 475/26 |
| 4,495,829 | A | * | 1/1985 | Kemper | 475/166 |
| 4,726,244 | A | * | 2/1988 | de Pencier | 475/192 |

FOREIGN PATENT DOCUMENTS

| CN | 2336137 | 9/1999 |
|---|---|---|
| CN | 1375646 | 10/2002 |
| EP | 1925849 | 5/2008 |
| GB | 215209 | 5/1924 |
| JP | 01-003228 | 7/1990 |
| JP | 10-169740 | 6/1998 |
| JP | 2005-291340 | 10/2005 |

OTHER PUBLICATIONS

Written Opinion of the International Search Authority for International Application No. PCT/EP2008/057009 by European Patent Office.
International Search Report issued Aug. 4, 2009 to international application No. PCT/EP2008/057009.
First Office Action in Chinese Patent Application No. 200880129585.X, dated Feb. 7, 2013.
Office Action in Japanese Patent No. 2011-511985, dated Mar. 4, 2013.

* cited by examiner

Primary Examiner — Edwin A Young
(74) Attorney, Agent, or Firm — Knobbe Martens Olson & Bear LLP

(57) ABSTRACT

The invention provides a new type of reversible variable transmission for vehicles such as cars, busses, trucks, off-road vehicles, lift trucks, telescopic boom handlers and the like. Alternatively, the gearbox can be used in systems such as wind-mills etc. and other industrial applications that require power to be transferred at variable speeds.

20 Claims, 21 Drawing Sheets

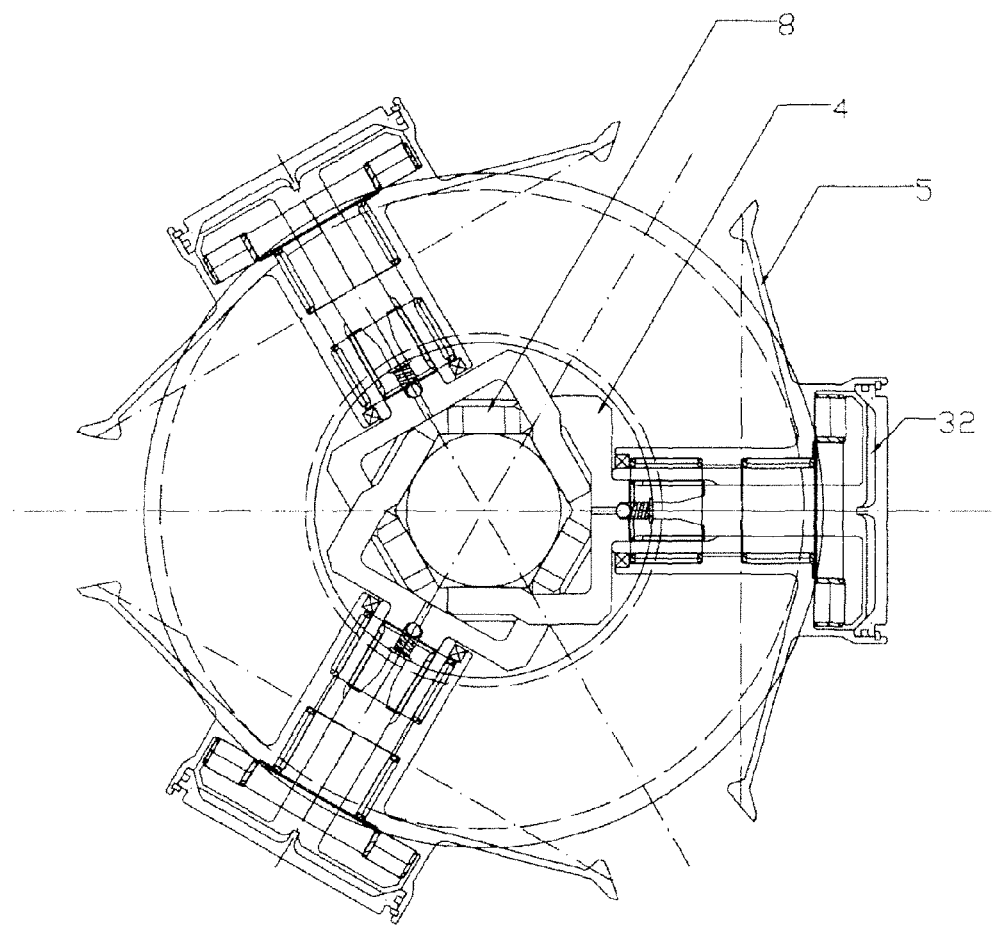
FIG 4: SHOWN IN POSITION OF SPEED RATIO ZERO

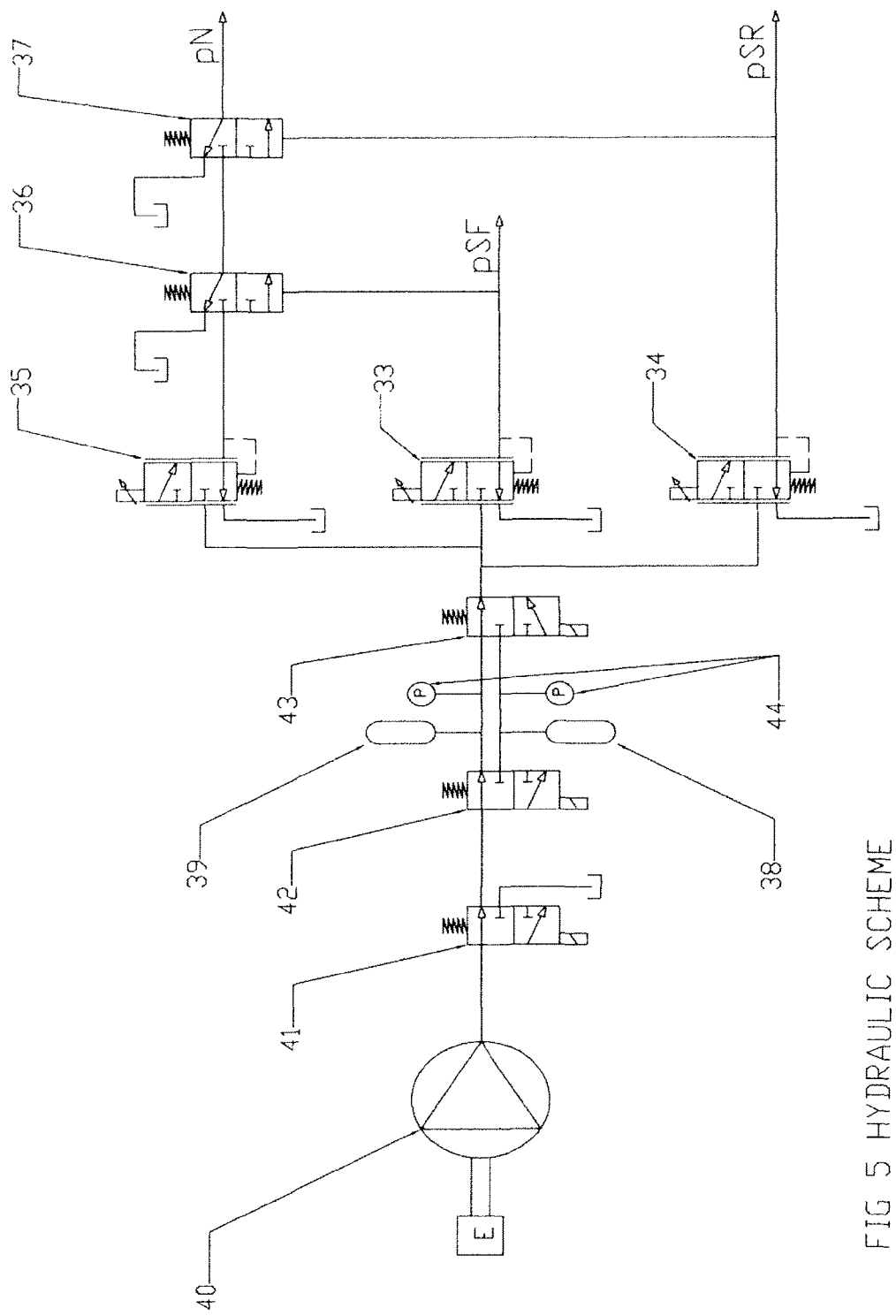
FIG 5 HYDRAULIC SCHEME

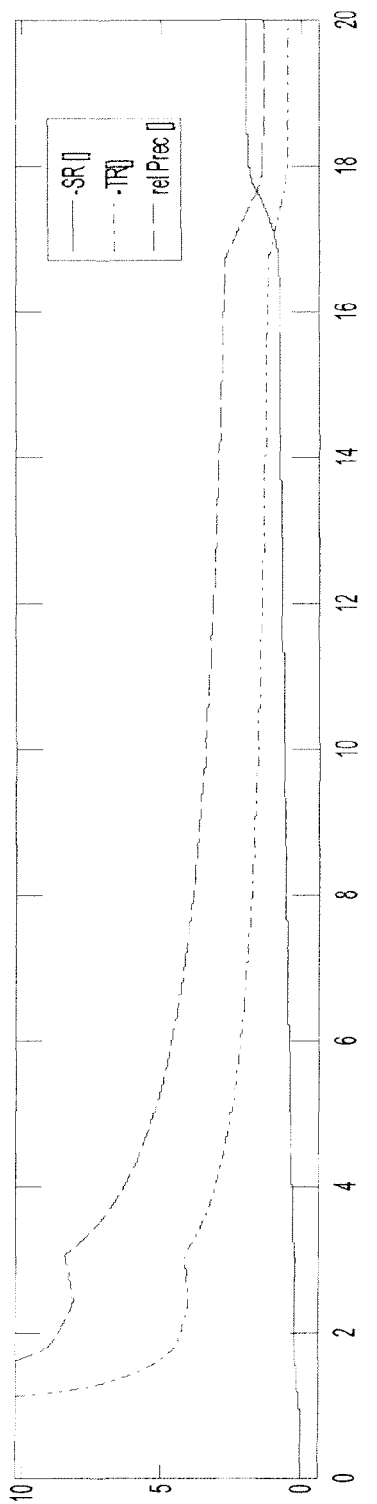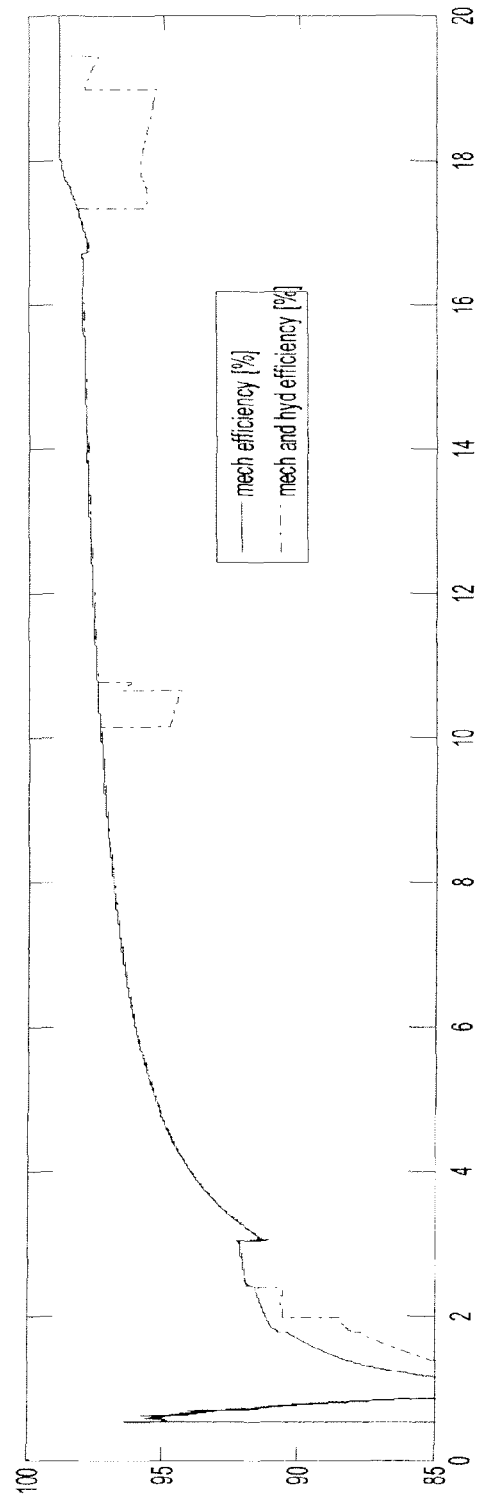
FIG. 11 b

REVERSIBLE VARIABLE TRANSMISSION-RVT

CROSS-REFERENCE TO RELATED APPLICATIONS

This application is the U.S. National Phase under 35 U.S.C. §371 of International Application PCT/EP2008/057009, filed Jun. 5, 2008.

FIELD OF THE INVENTION

The invention relates to the field of gearboxes/transmissions. Especially, the invention provides a new type of reversible variable transmission for vehicles such as cars, busses, trucks, off-road vehicles, lift trucks, telescopic boom handlers and the like. Alternatively, the gearbox can be used in systems such as windmills etc. and other industrial applications that require power to be transferred at variable speeds.

BACKGROUND OF THE INVENTION

The advantages of the present invention can be described best by showing the discrepancies between the ideal and the car transmissions currently available.
The Ideal Transmission Theoretically the ideal car transmission transmits the engine power to the wheels so that for any required power level, the engine works at its highest efficiency point, whatever the car speed.

An engine works at its highest efficiency when the throttle is pushed deeply, as is shown in the graph of FIG. 10 showing the specific fuel consumption of a diesel engine. The power is modulated rather by changing the engine speed than by changing throttle. For example, driving on a highway at 120 km/h at constant speed requires only about 25 HP. The optimum engine speed is then about 1300 RPM for modern engines. The required transmission torque ratio is then 0.441, while a typical ratio of an actual gearbox varies from 0.90 to 0.65 in highest ratio. Conclusion is that the ratios of the current gearboxes are not high enough for optimum engine efficiency.

FIG. 10 illustrates the statement above. With the known gearboxes, the car drives at 120 km/h at 2400 RPM and with 73 Nm from the engine. The specific fuel consumption (SFC) is then 265 g/kWh. In the ideal case (of a low torque engine) the engine speed must be reduced only to 1700 RPM to obtain the highest efficiency. The engine produces then 103 Nm with a SFC of 225 g/kWh. This is a fuel saving of 15%. This is for example a fuel saving from 6.5 l/100 km to 5.5 l/100 km, only obtained from improving the engine operating point, not considering the efficiency of the transmission.

For drive away the ideal transmission needs an infinite torque ratio.

When the car is still at zero speed and the engine speed is at least idle speed, the transmission ratio must be infinite. Current solutions with a slipping clutch or a slipping torque converter spoil a lot of energy during every launch.

The above must remain true also during and after a sudden throttle position change. (A throttle position change is in fact a change in requested engine power.)

This means that the ratio should be able to change very fast. Suppose the car drives at a constant moderate speed with 85% throttle for optimal consumption. The engine produces only a small fraction of the available engine power. If acceleration is requested, without ratio change, the engine can only accelerate with the remaining 15% throttle, so that the low power can only increase with 15%. Thus immediate downshifting is needed to obtain the requested engine power: the transmission must change immediately the ratio so that the engine accelerates to the engine speed where it produces the requested power with optimal efficiency.

The ideal transmission must be environmental friendly, should not contain non-recyclable or toxic materials or oils.

The ideal efficiency should be 100%, size, weight and cost as low as possible, with perfect reliability and durability.
Limitations of Actual Car Transmissions
MT=Manual Transmission with dry clutch
AT=Automatic transmission with torque converter, possibly equipped with lock-up
DCT=Double Clutch with wet or dry clutches
CVT-belt=Continuously Variable Transmission with a belt between 2 conical pulleys
CVT-toroid=Continuously Variable Transmission with half or full toroidal pulleys
HSD=Hydrostatic drive. This is a hydraulic system with a variable axial piston pump, driven by the engine and a variable hydraulic motor driving a gearbox or directly the wheels. The output speed is variable from zero to a certain speed and by switching a valve, the rotation sense can be reversed.

|  | Efficiency (highway) | Problems |
| --- | --- | --- |
| MT | high efficiency ca 88-97% | Much more gears and a larger spread are needed to improve fuel economy (1) More gears require too much shifting and confuse the driver |
| AT | moderate efficiency ca 88-92% | Much more gears and a larger spread are needed to improve fuel economy (1) More gears result in higher cost During shifting the efficiency is low. More shifting counteracts the improvement of fuel consumption. |
| DCT | high efficiency 89-95% | Much more gears and a larger spread are needed to improve fuel economy (1) More gears result in higher cost More gears -> more shifting-> more use of the clutch-> more energy dissipation |
| CVT-belt | low efficiency <85%? | The belt should not slip to transmit torque, but the belt must slip to change ratio. So low efficiency when changing the ratio or slow ratio changes. High pressure is needed in the pulley, which leads to high hydraulic losses. |

-continued

|  | Efficiency (highway) | Problems |
|---|---|---|
| CVT-toroid | low efficiency <85%? | The pulleys are rolling over each other with a drilling motion. This drilling motion creates a forced macroslip. This slip reduces the efficiency and creates heat which needs to be dissipated. |
| HSD | Very low efficiency Ca 70-80% | Heavy system, often used for off-highway (wheel loaders...) or small trucks. Without gearbox, low max speed ratio in an acceptable efficiency range. |

(1) Refers to the history of the typical number of gear ratios in a passenger car:

|  | MT | AT | DCT | Highest gear ratio |
|---|---|---|---|---|
| years 70 and earlier | 4 | 3 (+1st gear used only in kickdown) |  | 1 |
| years 80 90 | 5 | 4 |  | about 0.90 to 0.95 |
| years 2000 2007 | 5-6 | 5-6-7 | 6-7 | about 0.65 to 0.90 |

Conclusion:

MT, AT, DCT: although always more gears are needed to improve fuel consumption, there is somewhere a practical limit where no further improvement is possible. The highest ratios are still not high enough for optimum fuel economy.

CVT: low efficiency; also the highest ratio is still not high enough for optimum fuel economy.

There is therefore a need for an improved gearbox or transmission that overcomes the above indicated limitations and disadvantages.

SUMMARY OF THE INVENTION

The invention provides a reversible variable transmission comprising so-called planetary variators defined below.

The invention provides a Planetary Variator (13), functioning as subsystem for variable or reversible transmissions, able to vary continuously the transmission ratio, characterized by
  that it consists of a ring wheel (1), two or more planets (2) mounted around a central shaft (12) and a sun wheel (3), so that each component, namely the ring wheel, the central shaft and the sun wheel form an interface with other transmission components
  that the ring wheel is an axisymmetric body around the central axis with a rolling surface shaped according the tractrix curve, and that this surface is preferably hardened or coated to withstand tractional and compressive forces
  that the sun wheel is principally the same as the ring wheel but the inner and outer diameter of the tractrix curve may differ from the diameters of the ring wheel
  that the planets consist of a planet wheel (5) with basically a conical rolling surface, preferably hardened or coated to transmit tractional and compressive forces, mounted freely rotational around a planet fork (4) by means of radial and axial bearings or bushings (8) and that the virtual top of the mentioned cone coincides with the intersection of the axis of the central shaft (9) with the axis of the hinge of the planet (2)
  that each planet fork (4) of one Planetary Variator (13) can rotate freely around a hinge joint (8) of which the axis is perpendicular on the central shaft axis and parallel to the planet wheel plane and that each planet fork and each planet wheel is designed not to interfere with each other for all applicable inclination angles between the planet axis and the central shaft axis
  that the ring wheel, planets and sun wheel are squeezed against each other so that the rolling surfaces are in contact with each other and that the contact pressures are high enough to transmit the required torque
  that the central shaft is moved axially (longitudinally) with a defined speed in relation to the squeezing force and transmitted torque, in order to change the transmission ratio
  that the tractrix curve of ring and sun wheel have both the same length parameter L as the length from the rolling contact point of the planet wheel to the intersection of the hinge axis with the central shaft axis, where L is used in the tractrix equation $+/-x+c=L*(\cos\alpha+\ln|\tan(\alpha/2)|)$, with c an arbitrary constant and $\alpha$ the inclination angle between the tangent in the contact point and the axis of the central shaft
  and that the shape of the rolling surfaces of the planet wheels, which is basically conical, deviates slightly from this theoretical shape in a convex way in order to optimize the contact pressure distribution.

The invention further provides a reversible variable transmission, comprising a primary and a secondary Planetary Variator according to the invention, characterized in that
  the ring wheel (1a) of the primary Planetary Variator (13a) is connected to the housing (14) so that it cannot rotate but can move axially by a preload force compressing all rolling contacts of both Planetary Variators
  the central shafts of both Planetary Variators are combined into 1 main shaft (12) and rotationally connected to the transmission input shaft (11) and axially movable by a steering force in both senses, while the input shaft does not move axially
  the sun wheel (3a) of the primary Planetary Variator (13a) is connected to the ring wheel (3b) of the secondary Planetary Variator (13b) so that the combined ring-sun wheel can rotate around the central axis of the transmission
  and in that the sun wheel (3b) of the secondary Planetary Variator (13b) is connected to the output shaft of the transmission and that the reaction force of the preload force is transferred to the housing over an axial bearing.

The invention further provides a reversible variable transmission according to the invention, further characterized in that
  the relative dimensions of the ring wheel, sun wheel and planets are chosen appropriate for a car application, meaning that the highest speed ratio is so high that the engine can deliver its power nearly always at its best efficiency point. In particular, the dimensions related to the transmission ratio are: outer diameter primary and secondary ring wheel, inner diameter primary and secondary sun wheel, effective diameter planet wheels, length parameter L of the tractrix equation; the obtained transmission speed ratio of the shown example is 2.266 (in absolute value) which illustrates the ratio range typical for the concept. (Transmission speed ratio is output speed divided by input speed, neglecting efficiency losses.)

the relative dimensions of the ring wheel, sun wheel and planets are chosen appropriate for a car application, meaning that the highest speed ratio in reverse is high enough to drive the car with moderate engine speed and low noise in reverse. In particular, the dimensions related to the transmission reverse ratio are: inner diameter primary and secondary ring wheel, outer diameter primary and secondary sun wheel, effective diameter planet wheels, length parameter L of the tractrix equation; the obtained transmission speed ratio in reverse of the shown example is 0.695, which illustrates the ratio range typical for this concept.

and in that by moving the main shaft of the transmission, the transmission ratio varies continuously between the highest speed ratio in forward over standstill to the highest transmission ratio in reverse.

The invention further provides a reversible variable transmission according to the invention, further characterized in that the Normal force on each rolling contact is created by one preload force, acting from the housing on the not rotating primary ring wheel and that the reaction force is transferred over one bearing from the secondary sun wheel to the housing and in that the net steering forces for defining the position of the main shaft and thus also for defining the transmission ratio, are created by one force in one of both senses and acting from the input shaft to the main shaft, both rotating with the same speed, and that the reaction force is transferred over bearings from the input shaft to the housing.

The invention further provides a reversible variable transmission according to the invention, further characterized in that the preload force as explained above is created by one or more piston and cylinder system(s) between housing and primary ring wheel and activated by a single pneumatic or hydraulic pressure or created by a mechanical preload system, where this mechanical system can also be used as parking brake when the transmission is put in zero speed ratio.

the steering pressure is created by a hydraulic or pneumatic piston cylinder system, able to work in both senses, integrated in the input shaft and main shaft and in that the hydraulic or pneumatic pressure to create the steering pressure mentioned in claim 4 is sealed between the stationary housing and the rotating input shaft by piston rings or seals designed to seal parts rotating at different rotational speeds.

The invention further provides a Hydraulic system, intended to control a reversible variable transmission according to the invention in a car, truck or other on-highway or off-highway vehicle, characterized in that one engine driven pump is used to deliver the hydraulic pressure and flow a high and a low pressure accumulator are integrated in the system, wherein the fluid from the low pressure accumulator for pressurizing the preload piston (30) and the steering piston (28) is used with priority over the high pressure accumulator the high pressure accumulator is filled up by the pump with priority over the low pressure accumulator the pressure reducer valves are used to control the preload pressure and the steering pressures for forward and reverse driving sense possibly a safety feature is added by means of 2 shut off valves in the preload pressure line and that one of them is switched by the forward steering pressure and the other by the reverse steering pressure in order to drain the preload pressure immediately as soon as one of the active steering pressures drops below a certain bias pressure and in that the mentioned safety feature can be simplified by taking out the safety shutoff valve (37) from the hydraulic scheme.

The invention further provides a software program intended to control a reversible variable transmission according to the invention with a hydraulic valve according to the invention in a car, truck or other on-highway or off-highway vehicle, characterized in that the curve (of engine torque versus engine speed) expressing minimal fuel consumption for every engine power level is stored in the controllers memory the PID controller defines the speed of the steering piston, connected to the main shaft, in order to get the engine speed equal to the required engine speed calculated from the curve of minimal fuel consumption the speed of the steering piston as proposed by the PID controller can be reduced to stay within the microslip range based on the calculation procedure and in that the preload pressure and the steering pressure determining the angle of the planets relative to the axis of the main shaft are calculated based on the published theory of longitudinal and transverse microslip.

The invention further provides for the use of a combination of one or more Planetary Variators according to the invention, in different variable transmission layouts, characterized in that each interface of the Planetary Variator, namely the ring wheel, the central shaft and the sun wheel, can be connected to the transmission input, output, housing, the interface with another Planetary Variator or any other transmission component such as offset gears or planetary gear systems.

or in that different reversible variable transmission layouts can be made as described above. The expression 'reversible' means here a variable transmission of which the output rotation sense, relative to the input rotation sense, can be changed continuously and of which the speed ratio is defined even at very low and zero output speed, without (macro-) slipping components as used in torque converters or friction disc clutches.

The invention further provides a reversible variable transmission according to the invention, further characterized in that the transmission interior where the rolling contacts are moving, is filled with an inert gas, or normal air and a splashing fluid for cooling and lubrication, or a gas with a mist of a coolant and in that this said interior is sealed from the lube oil for the bearings and from the exterior of the transmission.

The invention further provides a Planetary Variator according to the invention, further characterized in that the lubrication flow for the bearings or bushings inside the planets is possibly realized by a closed circuit for each planet and that the oil is pumped around by vanes inside the planets, pumping outwards the oil, which is further guided through the bearings or bushings an alternative lubrication flow for the bearings or bushings inside the planets is realized by integrating this oil flow in the main lube flow comprising all bearings of input and output shaft. The flow is taken from the central shaft through one of the hinges (in particular one of the hinge pins), guided through the bearings of the planets and flowing back via the other hinge (or in particular the other hinge pin) into the central shaft and in that another alternative is that the bearings of the planets are lubricated with grease or that hybrid bearings are used which do not require any lubrication.

The invention further provides the use of a transmission according to the invention to transmit power at variable speeds in a car, truck, bus, off-road vehicle, mowing machine, wind turbine, telescopic boom handler, lift truck or any other industrial application in which power needs to be transmitted at variable speeds.

The invention further provides a (reversible) variable transmission system comprising a transmission of the invention, a hydraulic system according to the invention and a software program according to the invention.

BRIEF DESCRIPTION OF THE DRAWINGS

Nomenclature of parts in the drawings: (1) ring wheel, (2) planet, (3) sun wheel, (4) planet fork, (5) planet wheel, (6) planet radial bearing, (7) planet thrust bearing, (8) hinge pin, (9) central shaft, (10) pressure relief valve, (11) input shaft, (12) main shaft, (13) Planetary Variator, (14) housing, (15) axial bearing at input, (16) radial bearing at input, (17) bushing sun-ring wheel, (18) radial bearing at output, (19) axial bearing at output, (20) input bushing, (21) output bushing, (22) oil distributor, (23) piston rings, (24) lip seals, (25) sealing tube, (26) forward steering cylinder, (27) reverse steering cylinder, (28) steering piston, (29) preload force piston, (30) preload force cylinder, (31) locator pins, (32) oil pumping vanes, (33) pressure reducing valve for forward steering pressure (pSF prop), (34) pressure reducing valve for reverse steering pressure (pSR prop), (35) pressure reducing valve for Normal pressure (pN prop), (36) safety shut off valve for forward steering pressure, (37) safety shut off valve for reverse steering pressure, (38) low pressure accumulator, (39) high pressure accumulator, (40) oil pump, (41) hydraulic pump switch, (42) hydraulic feed switch, (43) hydraulic accumulator switch, (44) pressure sensors, (45) steering force, (46) output shaft, (47) torque transferring device (i.e. spline connection), (48) ring gear, (49) planetary gear, (50) planetary gear carrier, (51) sun gear, (52) preload force, (53) steering force, Index a: primary Planetary Variator, Index b: secondary Planetary Variator.

FIG. 1: Schematic representation of the ring or sun wheel (1,3) interacting with the planets (2). L represents the length from the top of the rolling cones to the point of rolling contact.

FIG. 4: Schematic representation of the planets and there connection to the main shaft of the transmission.

FIG. 5: Schematic representation of the hydraulic scheme

DETAILED DESCRIPTION OF THE PREFERRED EMBODIMENTS

Figure 1A:
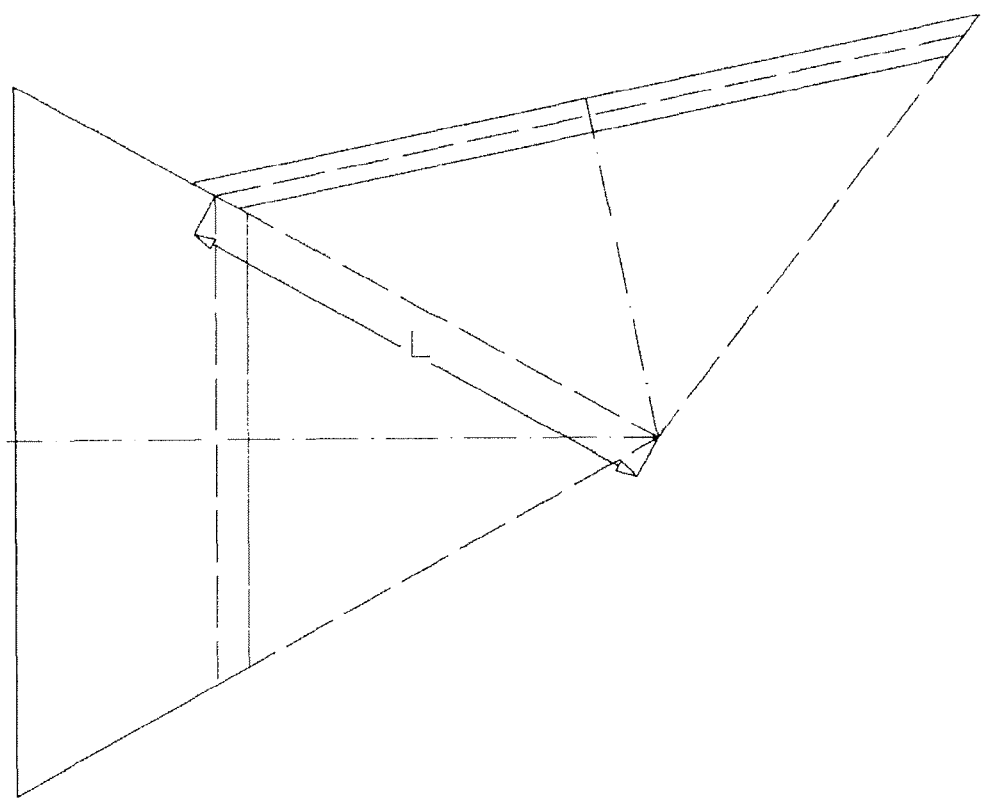
FIG. 1a shows 2 cones rolling over each other. Only when the tops of both cones coincide, the cones can roll over each other (with fixed axis positions) with pure rolling without sliding.

The transmission of the present invention can be compared best with a tordïd transmission. A half or full tordïd transmission has the drawbacks that the total spread is limited. It needs also a torque converter or another device for drive away and a shift mechanism and gears for the reverse driving sense. The major disadvantage is that the planet wheels and pulleys are rolling over each other with a drilling motion which means that the rolling contacts are by their geometry forced into macroslip while transmitting driving forces. Consequently these rolling contacts must be lubricated to reduce wear and to dissipate the heat. The lubricated surfaces have a low friction coefficient. In order to transmit driving forces by the contact surfaces, these surfaces must be pressed against each other with high forces, so that a heavy design is needed. Another consequence of the macroslip is of course the lower efficiency of the transmission.

Description of the Components

Principally the transmission of the present invention is composed of 2 so called Planetary Variators. A Planetary Variator is a mechanical subsystem, comparable to a planetary gear system, but with a variable ratio and with rolling surfaces instead of gears. The Planetary Variator is designed so that in the rolling contacts pure rolling without drilling motion occurs. In the application of the transmission of the present invention, the contact pressure of the rolling contacts is controlled so that the contact stresses stay within the acceptable limits and that the contact pressure is high enough to avoid macroslip.

In literature microslip is described as a condition of two rolling surfaces subjected to a Normal load and transmitting a tangential force (tangential to the surface) so that in the contact area a sub region is present where the two surfaces are sticking together. Outside this sub region, but still within the contact area, creep occurs due to elastic deformation of the bodies.

Macroslip is a condition where this sub region with a sticking contact is not present. In macroslip condition the magnitude of slip is not controllable.

The Planetary Variator

The Planetary Variator subsystem (FIG. 2) is composed of the following parts:
  The ring wheel (1)
  The planets (2)
    The planet fork (4)
    The planet wheel (5)
    Radial bearings (6)
    Thrust bearing (7)
    Hinge pins (8)
    Central shaft (9)
  The sun wheel (3)

Ring wheel (1), sun wheel (3) and central shaft (9) all have a common rotational axis. The ring wheel (1) is axially compressed against 2 or more planets (2) with a preload force (52). The planet wheels (5) can rotate freely around the fork (4) by means of radial bearings (6). Centrifugal forces and forces resulting from the preload force (52) are transferred by the thrust bearing (7) to the planet fork (4). Each planet fork (4) can rotate freely around the hinge pins (8) in the plane created by the central shaft (9) and the planet fork (4). The hinge axis of each planet (2) crosses the central shaft (9) in the same point. The planet wheels (5) are pushed against the sun wheel (3) which delivers the reaction force for the preload force (52).

By changing the relative position of the hinge to the wheels, the transmission ratio is changed. During changing the ratio, the transverse contact speed and the contact pressure must be controlled in order to keep the transverse and longitudinal creep in the microslip range.

The Ring Wheel (1) and the Sun Wheel (3)

The active contact surface of both the ring and the sun wheel (1, 3) with the planets (2) is an axisymmetric surface with a special shape.

To obtain rolling without sliding of two bodies (planet and ring wheel, planet and sun wheel), their rotational axes and the tangent at their contact surfaces must cross all 3 in one point. See FIG. 1a: the tip of the 2 cones coincide. If one point of the contact surface rolls without slip over each other, then all points do. No drilling motion occurs.

Figure 1B:
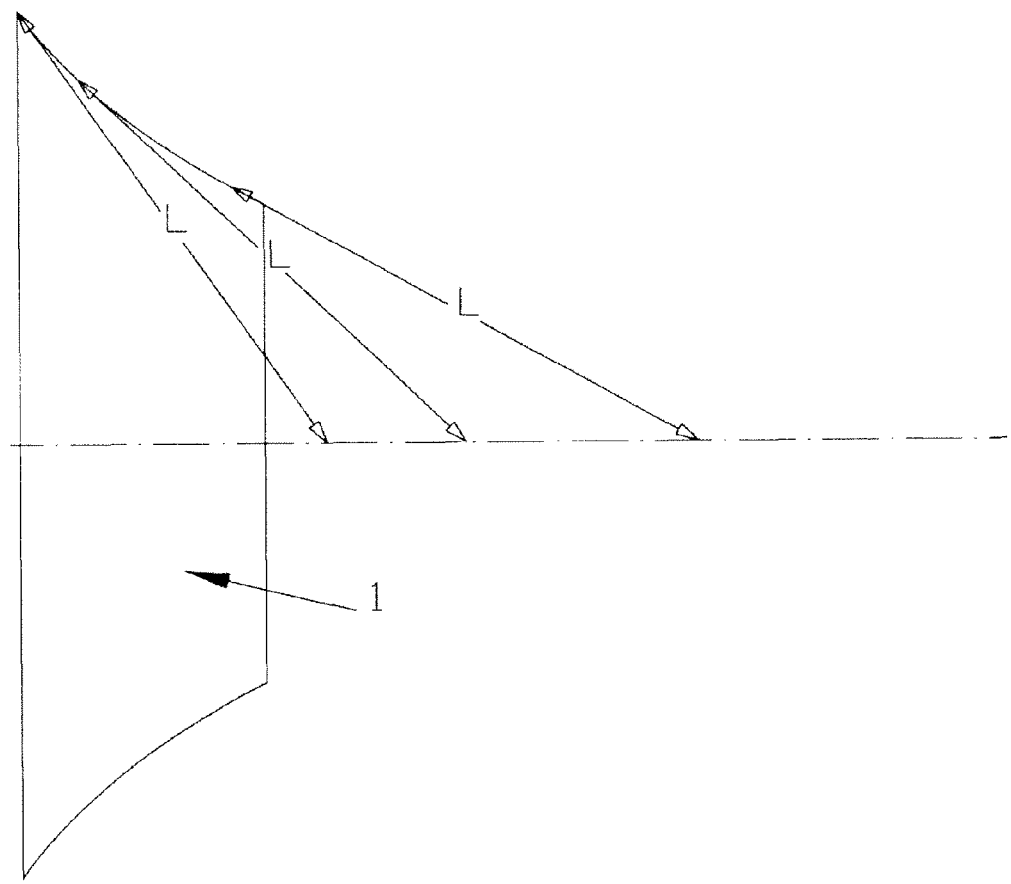
FIG. 1b represents the cross section of the ring or sun wheel and the tangent at different points on the curve.
Figure 1C:
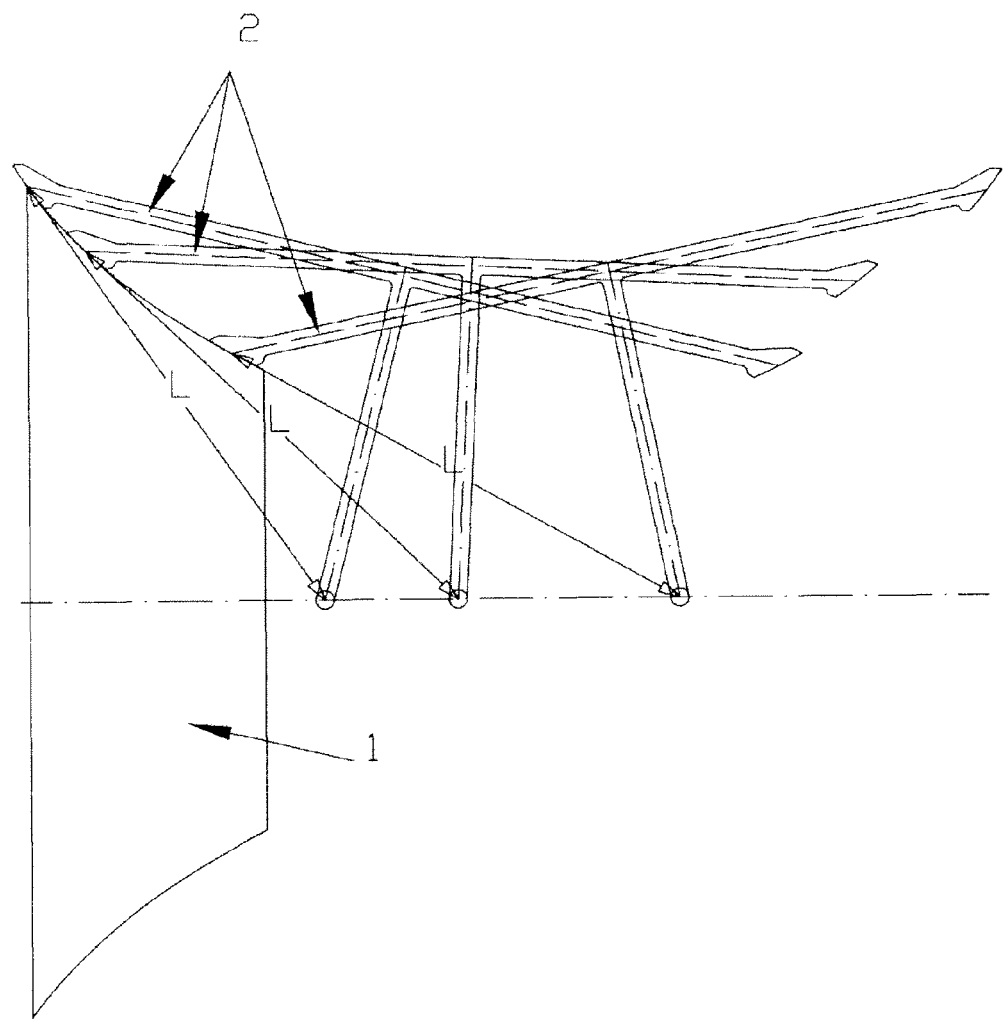
In FIG. 1c, the planets are added at these three points for better visualisation. Note that L is constant.

The curve of both sun and ring wheel offering rolling without slip can be constructed from its properties in the xy-plane: any tangent of the curve must cross the central x-axis so that the distance from this intersection with the x-axis to the point of tangency is a constant L. The intersection point with the x-axis is the position of the hinges. The curve is then generated by the following set of differential equations:

$$L \sin \alpha = y$$

$$\alpha = \arctan(dy/dx)$$

where:
  x horizontal axis representing the axis of rotation
  y-axis perpendicular on the x-axis
  L length from hinge to point of rolling contact
  α the angle of the tangent with the x-axis After integration:

$$+/-x+c = \sqrt{(L^2-y^2)} - L/2 * \ln((L+\sqrt{(L^2-y^2)})/(L-\sqrt{(L^2-y^2)}))$$

or:

$$+/-x+c = L*(\cos \alpha - \tfrac{1}{2}*\ln((1+\cos \alpha)/(1-\cos \alpha))$$

or:

$$+/-x+c = L*(\cos \alpha + \ln|\tan(\alpha/2)|)$$

with c an arbitrary integration constant.
By limiting y and α to $$0 <= y <= L$$

$$0° <= \alpha <= 90°$$

the surface of revolution around the x axis can be constructed. This surface is shown in FIG. 1b: the tangent at 3 random points on the curve intersects the x-axis with a length L from the tangent point to the intersection with the x-axis. In FIG. 1c the planets are added in these 3 points. The distance of the contact point of the planet to its hinge is also L so that the conditions for pure rolling are fulfilled for all positions of the hinge along the x-axis. In mathematics, this curve is known as the tractrix curve and is described for the first time by Christian Huygens and Claude Perrault in the year 1693. This curve is mostly formulated in a different mathematical expression, but the formula above is more practical for the application in this transmission.

In practice, the surface may deviate slightly from the theoretical one to compensate for compression or wear of the surface. The contact surface material, hardness, roughness, condition, coating and the lubrication fluid or gas are selected to optimize traction and wear. Such compositions are well known in the art of gear profile technology and machining tools.

The ring wheel and sun wheel have features to allow or prohibit rotation, to allow or prohibit axial movement and to centre the component, dependent of their function inside the transmission and the type of transmission. Some non-limiting examples of different configurations of the ring wheel—planet—sun wheel combinations are depicted in FIGS. 3 and 6-8. In these embodiments, the first ring wheel is not capable of rotating, while in alternative embodiments, the ring wheel can be rotating while the planets rolling on to the ring wheel are fixed. In yet alternative embodiments, both the ring wheel and the planets can be rotating independently from each other e.g. at different speeds. In fact, any configuration is possible, as long as the concept of the axisymmetric contact surfaces of the planets with the ring and sun wheels as outlined above is respected.

Materials Used

In a preferred embodiment, the rotating components (planets and wheels) are constructed out of steel or hardened steel, the casing of the transmission can e.g. be Aluminum and the cover with vanes can e.g. be composed out of Aluminum or plastics. Any other suitable material known in the art of being capable of supporting the needed material hardness, traction requirements and wear resistance can be used.

The coating of the surface of the interacting surface of the planets and wheels can e.g. be composed out of: AlTiN (Aluminium Titanium Nitride), TiCN (Titanium Carbide Nitride), TiN (Titanium Nitride) or TiCrN (Titanium Chrome Nitride). Any other suitable material known in the art of being capable of supporting the needed material hardness, traction requirements and wear resistance can be used.

The Planets (2)

The Planetary Variator has two or more planets (2) for transmission of the driving forces. In a preferred embodiment, there are three planets per planetary variator, as depicted in FIG. 4. The tangent at the rolling surface crosses the centre of the hinge. The distance from the rolling contact point to the hinge equals L: this is the same length L as in the formula of the wheel surface.

(i) The Planet Wheel (5)

The rolling surface of the planet wheel (5) is crowned to avoid high edge contact stresses. Similar as with the surface of the ring and sun wheel, the contact surface material, hardness, roughness, condition and coating are optimized for traction and wear.

(ii) The Planet Fork (4) and the Hinge Pins (8)

Figure 2:
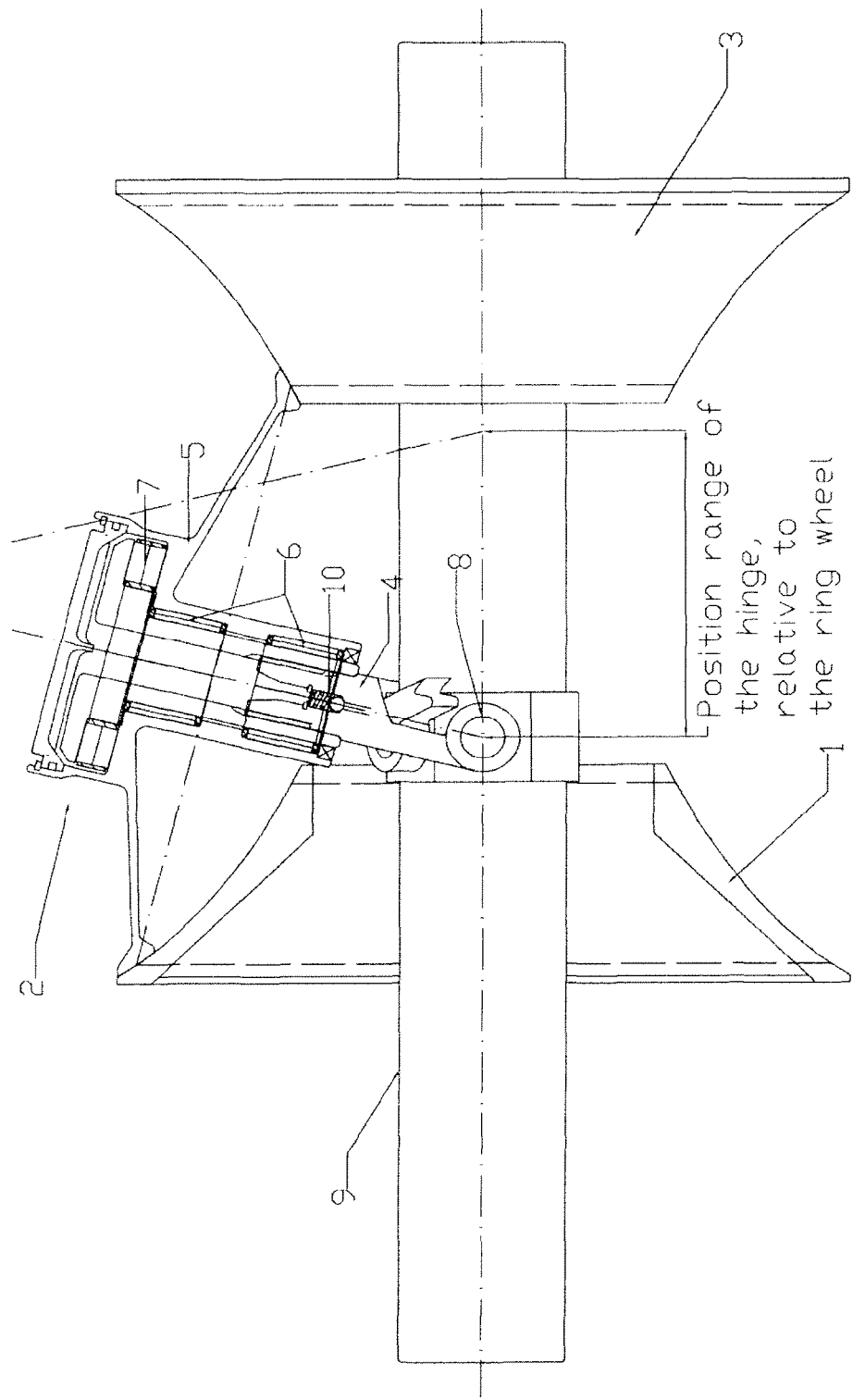
FIG. 2: Schematic representation of the Planetary Variator, comprising a planet (2), connected to the main shaft (9). The planet (2) is rolling over the ring wheel (1) and the sun wheel (3), resulting in the sun wheel to rotate at a certain output speed. Varying the inclination of the axis of the planet (2) relative to the main shaft (9) changes the output speed of the interacting sun wheel (3) for a constant speed of the main shaft (9). (4) planet fork, (5) planet wheel, (6) planet radial bearing, (7) planet thrust bearing, (8) hinge pin, (9) central shaft, (10) pressure relief valve.
Figure 3:
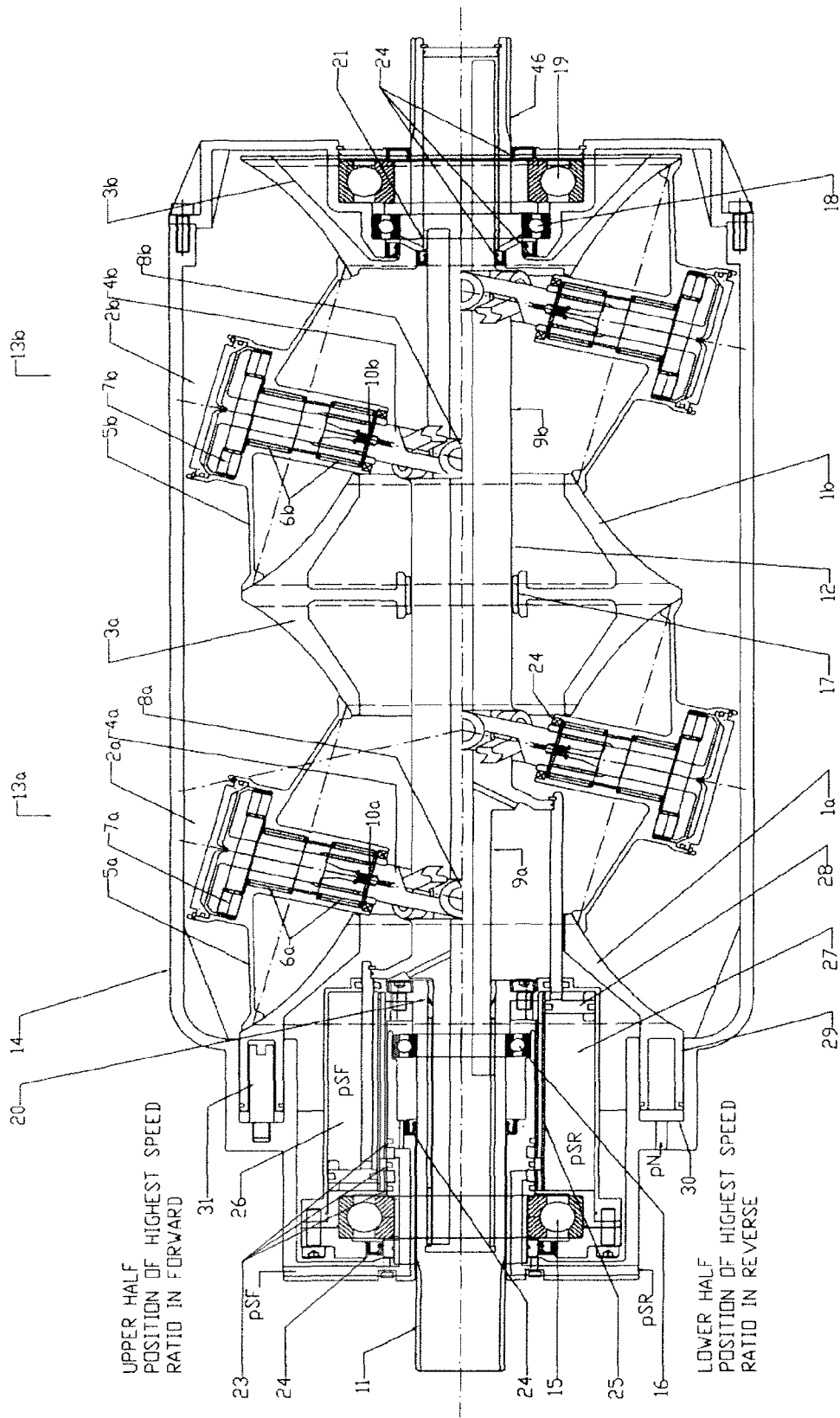
FIG. 3: Schematic representation of the reversible variable transmission of the invention.
Figure 3A:
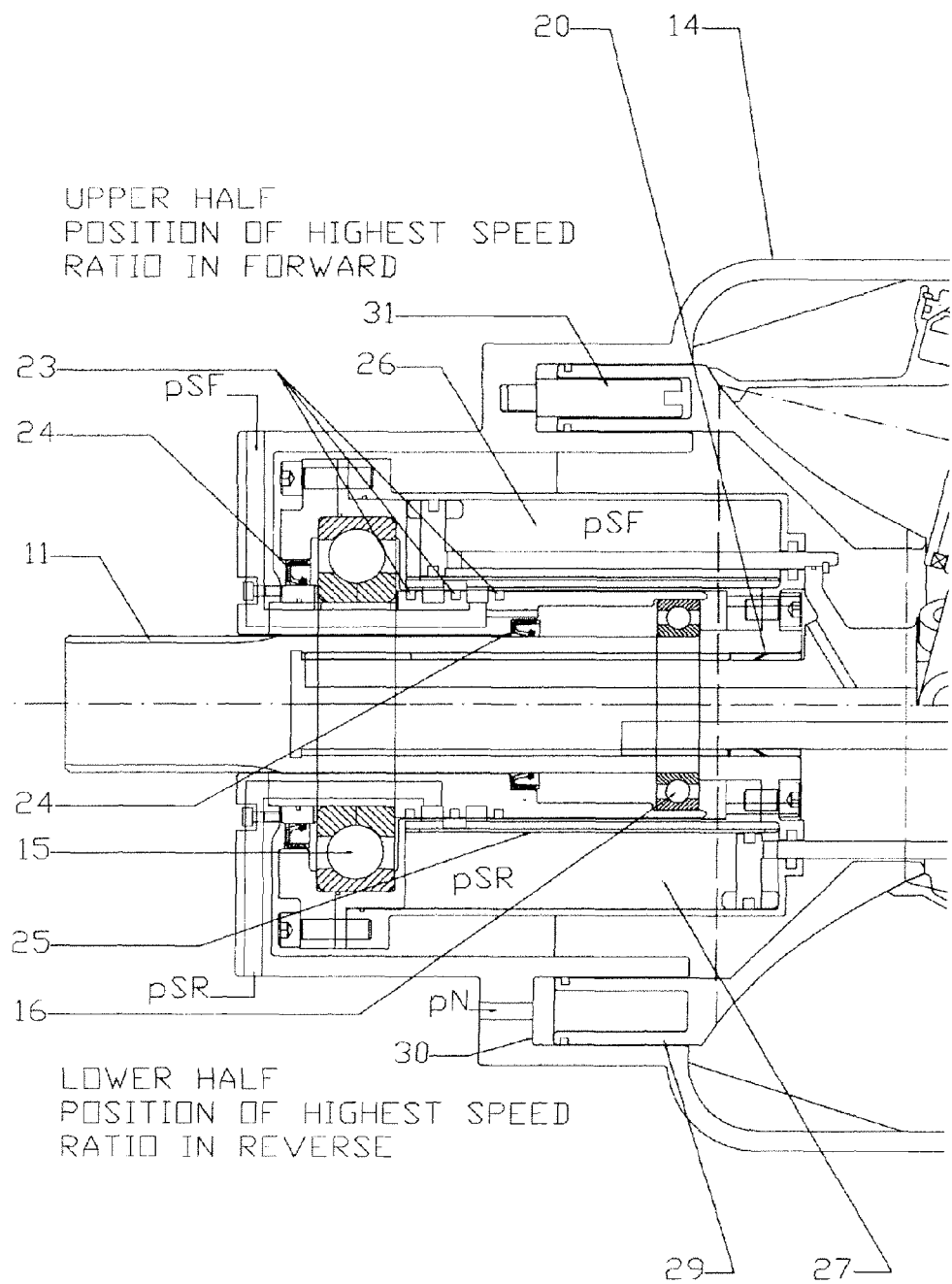
FIGS. 3a and 3b represent a magnified view of the first and second Planetary Variator respectively at their position in the transmission. Note that the second sun wheel (3) rotates at a variable speed around the axis of the transmission, in function of the positioning (sliding) of the Planetary Variators in the longitudinal direction of the gearbox, thereby changing the axis of the planets to the main shaft and subsequently the interaction with the ring wheel (1a) and (1b) and sun wheel (3a) and (3b).
Figure 3B:
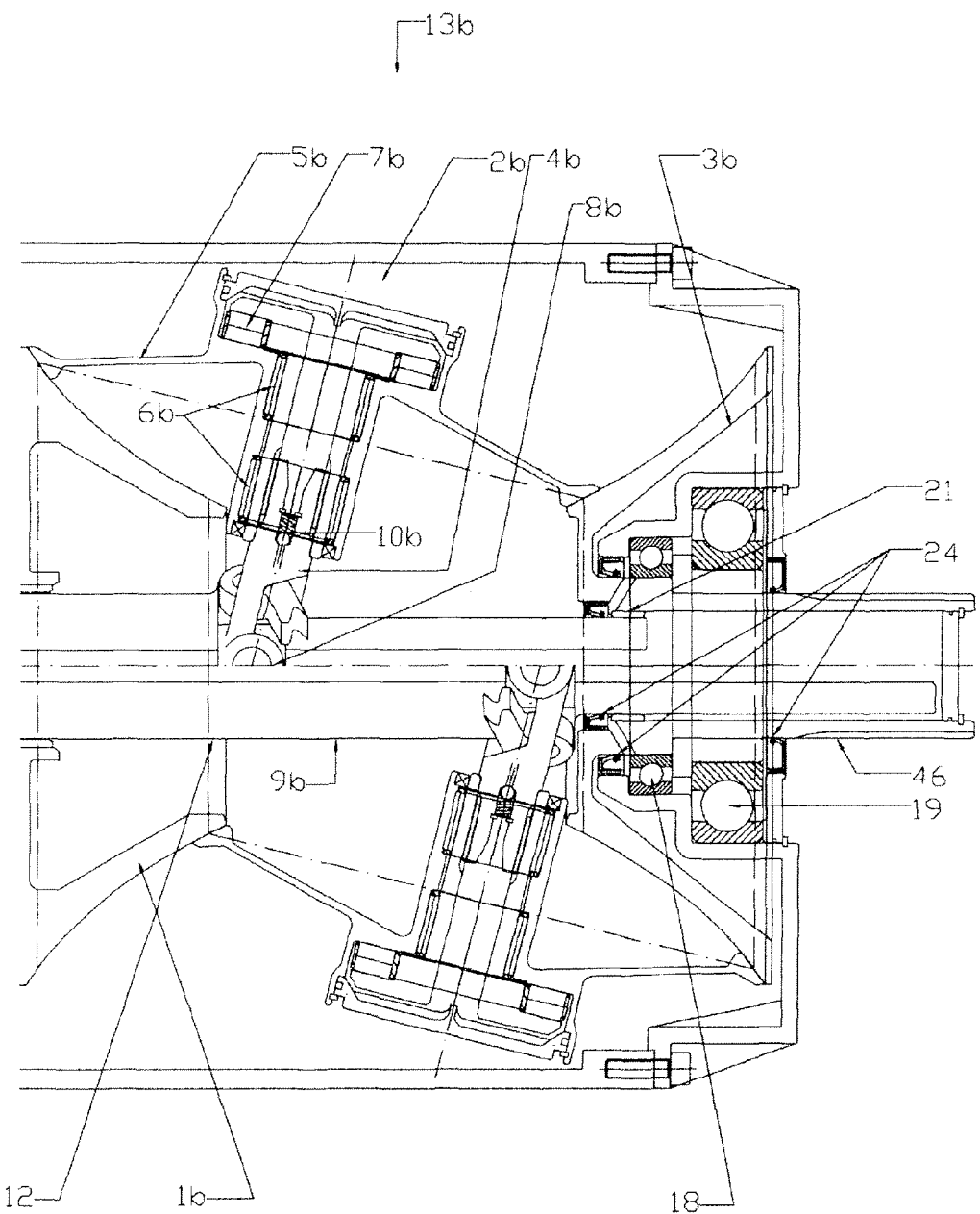
Figure 13:
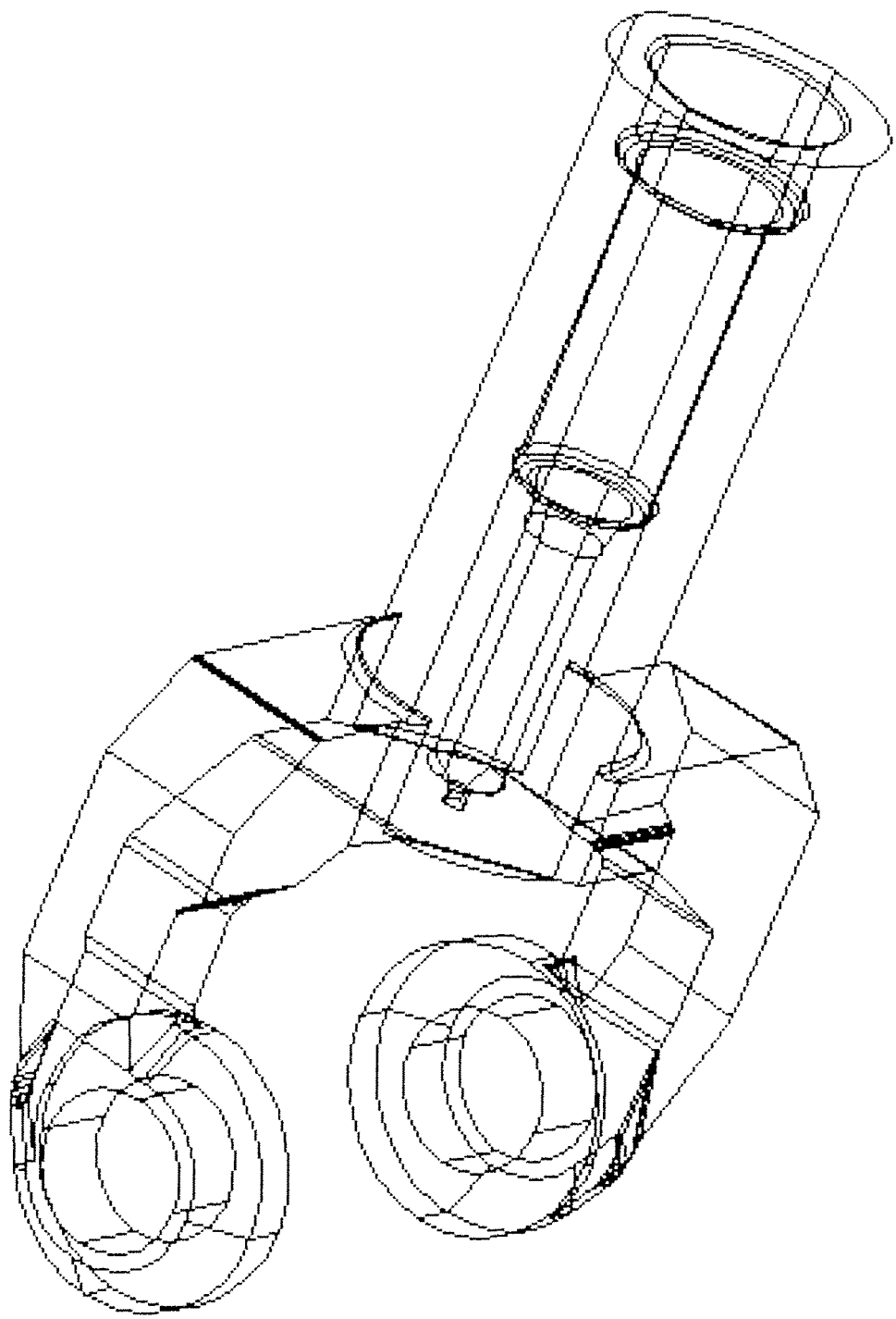
FIG. 13: Three-dimensional representation of a possible realization of a planetary fork

The forks (4) and hinge pins (8) are designed strong enough to deal with the centrifugal forces, the preload force (52) and the driving moments. On the other hand, the forks (4) may not interfere with each other for all inclination angles of the planets (2). A design of the forks is shown in FIGS. 2, 3 and 4. A 3-dimensional view is shown in FIG. 13. All 3 forks of 1 Planetary Variator are the same. The 2 legs of the fork (4) are each others mirror picture over the central axis of the fork (4).

(iii) Bearings and Lubrication

All bearings (6, 7) can be either roller or sliding bearings. An oil flow to cool and lubricate the bearings is realized by vanes in the planet wheel (5). The planet wheels (5) are always rotating when the engine runs. The pressure relief valve (10) opens below idle speed by centrifugal forces and closes by the spring force before the engine comes to standstill. This valve allows the oil to expand thermally without building up pressure. At standstill it must avoid that oil from the planets (2) contaminates the area of the rolling contacts which will require in general another or no lubrication. Alternative lubrication systems are of course possible. The use of hybrid roller bearings without lubrication is also possible.

Applications of the Planetary Variator

The Planetary Variator has, similar to a planetary gear system, three interfaces which can be input, output, a connection with the housing, a connection with another Planetary Variator or a connection to other transmission components such as planetary gear sets or offset gearing. With one or more Planetary Variators, possibly combined with other transmission components (such as planetary or offset gear sets), different variable transmission layouts can be built.

The Reversible Variable Transmission

General Layout

The combination of two Planetary Variators as described below and shown in FIGS. 3 and 4 is one of the different methods to obtain a reversible transmission. With 'reversible' is meant a transmission which can change output rotation sense in a continuously variable way and thus passing over speed ratio zero.

The engine is directly or via a torsion damper system connected to the transmission input shaft (11). This shaft is connected to the central shaft (9a) of the primary Planetary Variator (13a) in such a way that both shafts cannot rotate relatively to one another. This central shaft (9a) can slide axially relative to the input shaft (11). The central shafts (9a, 9b) of the primary (13a) and the secondary Planetary Variator (13b) are combined into one transmission main shaft (12).

The ring wheel of the primary Planetary Variator (1a) is fixed to the housing (14) with two or more locator pins (31) so that it cannot rotate, but only can move axially. It is pushed against the planets (2a) of the primary Planetary Variator by a controlled hydraulic pressure pN. The ring wheel (1a) moves axially when the transmission ratio changes.

Instead of fixed locator pins (31) a torsional vibration damper could be integrated by replacing the locator pins (31) by elastic elements such as springs and damping elements working in tangential direction and mounted between the housing (14) and the primary ring wheel (1a). These elastic elements should then allow a tangential movement of the primary ring wheel (1a) with high stiffness and an axial movement of the primary ring wheel (1a) with a much lower stiffness.

The sun wheel (3a) of the primary Planetary Variator is connected as one part with the ring wheel (1b) of the secondary Planetary Variator. This combined sun-ring wheel (3a, 1b) is centered by the planets of the primary and the secondary Planetary Variator (2a, 2b) without bearings for centering. However, to avoid vibrations of the long input shaft or to create a 'Neutral' (see 4.6.1), radial bushings or bearings (17) could be added between the sun-ring wheel (3a, 1b) and the main shaft (12). The sun-ring wheel (3a, 1b) moves axially when the ratio changes.

The planets (2b) of the secondary Planetary Variator are connected also to the main shaft (12).

The sun wheel (3b) of the secondary Planetary Variator is the output of the transmission. It is axially and radially located by bearings (18, 19). These bearings (18, 19) are selected to transmit the preload force (52) and the axial components of the steering force (53), centrifugal forces and gyroscopic forces acting on the planets (2a, 2b).

Field of Application

This transmission is conceived for passenger cars, but its application can be extended to:

Trucks: where many ratios, deep and high ones, together with a high efficiency are needed.

Off-highway
applications where creeper speed and a good efficiency at low speed is important such as large grass mowing machines
lift trucks which need a smooth low speed maneuvering ability in both driving senses and a relatively fast reverse (comparable to the $2^{nd}$ gear in forward)
machines like telescopic boom handlers where a low speed must be controllable independent from the varying resistance of the ground Wind turbines where the transmission "output" is connected to the very slowly rotating propeller and the "input" is driving the generator.

Other industrial applications where power must be transferred at variable speeds.

EXAMPLES

The invention is illustrated by the following non-limiting examples

Example 1

Details of an Example of a Transmission According to the Invention

The input shaft (11) is supported by bearing (15) and bearing (16). Bearing (15) withstands the axial resultant forces from the centrifugal, gyroscopic, transverse creep and spline friction forces. The bearings (15, 16) are housed in the oil distributor (22) which is connected with bolts to the housing (14). The input shaft coming from the engine is linked to the main shaft of the transmission by way of a spline-shaft element, allowing translational axional movement, but not rotation relative to each other. This way, the torque from the input shaft (11) is transmitted via the long internal spline to the outer splines of the main shaft (12). Instead of a spline, alternatives which transmit torque and allow axial movement (in the longitudinal direction of the shaft) are possible. The main shaft (12) is centered by the bushing (20) inside the input shaft (11) and another bushing (21) in the sun wheel (3*b*) of the secondary Planetary Variator. These bushings (20, 21) are not loaded by radial forces but must only centre the main shaft (12) and allow an axial movement. The first bushing (20) is split to allow mounting over the splines. The sun wheel (3*b*) of the secondary Planetary Variator is supported on two bearings (18, 19). One of them takes the axial loads.

Lubrication oil for the bearings (15, 16, 18, 19) and bushings (20, 21) is supplied from the housing (14) via bores to the oil distributor (22) over bearing (15) and bearing (16), then the flow splits. One part goes through the bushing (20) and the splines and then through the central bore in the main shaft (12). The other part by-passes these components over an orifice and joins the first oil flow in the central bore. At the end of the main shaft (12), the lube flow goes through bushing (21) and the 2 sun wheel bearings (18, 19). The oil flows back via a bore in the housing (14) to the sump.

The lubrication of the bearings (6*a*, 6*b*, 7*a*, 7*b*) of each planet is shown as a closed circuit, but alternatively it could be integrated in the lube circuit by an oil flow through channels inside the hinge pins (8*a*, 8*b*). This alternative would require seals between the hinge pins (8*a*, 8*b*) and the planet fork (4*a*, 4*b*). In the closed circuit design, the flow is generated by vanes (32) inside the planet wheel (5), pumping the oil outward. As soon as the input shaft is rotating, the planets (2) are also rotating around their axis and thus the oil is circulating through the bearings (6 and 7). The design of the lubrication supposes that the lubrication fluid or gas of the rolling contacts must not be mixed with the lubrication oil of the bearings. For this reason, the transmission interior with the rolling contacts is completely sealed from the lubrication oil for the bearings and sealed from the outside of course.

The housing (14) and the oil distributor (22) contains also 2 more bores for the steering pressures pSF and pSR. These pressures are sealed by 3 piston rings (23) between the oil distributor (22) and the rotating input shaft (11). The leaking oil from the steering pressure over the piston rings (23) is collected in the lube circuit. The lube circuit is perfectly sealed to the transmission exterior and to the area of the rolling surfaces by lip seals (24). Via the sealing tube (25) the steering pressures pSF and pSR are sealed and directed to the Forward steering cylinder (26) and the Reverse steering cylinder (27) respectively.

Bushing (17) is made from material for dry running or running in the gas or fluid for the rolling contacts. In normal operation this bushing (17) is not making contact with the main shaft (12). See section 4.6.1.

The Transmission Concept According to the Invention has the Following Advantages:

There is only one piston-cylinder system (29, 30) required to generate the preload force (52) which presses all contact surfaces against each other. This cylinder (30) is not rotating which makes the hydraulic (or pneumatic) supply easy because no dynamic seals are needed.

The steering cylinder (26, 27) is rotating with the same speed as the main shaft (12). Otherwise large bearings, working in both axial senses would be needed. The seals of the steering piston (28) move only axially and not tangentially. A relative rotation would be impossible at these large diameters and high engine speeds. In the shown layout of FIG. 3 only one steering piston (28) working in both axial senses is needed to move the central shafts (9) of both Planetary Variators.

By combining the 2 Planetary Variators as shown in FIG. 3 the transmission ratio of each Planetary Variator is amplified in such a way that a very long overdrive ratio is created in the forward driving sense. Another advantage is that also in the reverse driving sense a higher transmission speed ratio is obtained, which avoids a high engine speed when driving in reverse.

Figure 10:
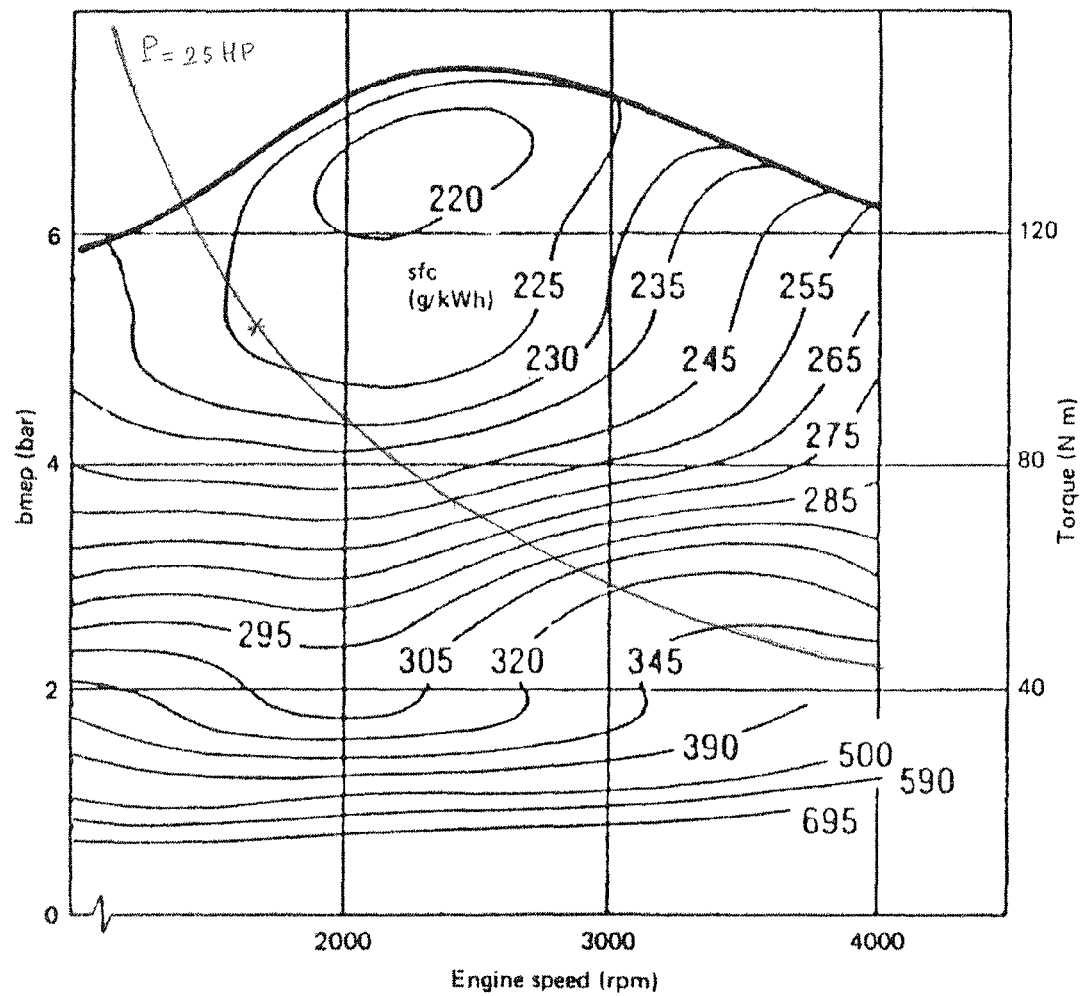
FIG. 10: Prior art scheme of the typical fuel consumption of a diesel engine and a traditional gearbox, adapted from Brandstetter and Howard 1989: specific fuel consumption for the Ford 2.5 liter D1 Diesel engine.

The long torque ratio (0.441) allows the car to drive at any speed and any power level with optimum engine efficiency. This will reduce the fuel consumption of the engine with 15 to 20%. See also engine graph in FIG. 10. Modern engines produce a lot of power at low engine speed. 25 HP (enough to drive about 110 to 120 km/h with constant speed) is produced with optimum efficiency close to an engine speed as low as 1300 RPM.

The target of the controls for this transmission concept is to run the engine always at its optimum efficiency. This means that at moderate engine power the engine runs at very low speed. This condition can only be acceptable to the driver if it is possible to change the ratio very fast when the driver suddenly pushes the throttle. Changing the ratio means that the planet wheels (5) must perform a transverse movement (=perpendicular to the rolling direction) over the ring wheel (1) and sun wheel (3). This is no problem because the transverse distance to overcome for a given ratio change, is so small relative to the longitudinal distance in rolling direction that this transverse movement can be done fast enough while the rolling contacts remain in microslip condition.

The torque ratio varies continuously from −1.44 (reverse) over infinite to +0.441 (forward). No drive away device is thus needed. During drive away, no energy is dissipated in a slipping clutch or torque converter. The absence of this heat dissipation reduces the fuel consumption over 0.1 to 0.12 l/100 km. Without main clutch or torque converter, costs and weight are also saved of course. The torque ratio varies thus continuously to infinite but the max output torque is limited to the torque corresponding with the tyre slip limit of the car on dry surface. It is easier to express the ratio in terms of speed ratio (=output speed divided by input speed). The speed ratio is then continuously varying from −0.695 in reverse over zero to +2.268 in highest gear forward.

For max acceleration from standstill with a drive-away device (torque converter or clutch), the engine must be brought to the speed where it delivers the maximum torque (or the torque needed to get close to the tyre slip). The acceleration of the engine needs time. During this time the maximum driving force is not available at the wheels. With a variable transmission with a speed ratio varying from zero as explained above, the maximum driving force is available as of idle speed of the engine. This maximum driving force is thus also available as of the very start of pushing the throttle. The simulation below shows that the transmission is able to increase the engine speed fast enough in order to maintain continuously the max driving force up to the point that the engine reaches its max power. (From this point on the engine speeds remains constant as long as the throttle pedal is completely pushed to the floor.)

The transmission can thus also stay at standstill and drive very slowly—forward or reverse—without any slipping component. The efficiency remains at very low speed also high. Driving at such low ratios is almost independent from the slope, uphill or downhill. (Very useful during parking on a slope or against a curb stone for instance). This very low speed ratio is also practical when driving away on slippery or snowy surfaces. In a conventional car with a slipping clutch, the driven wheels are torque controlled. When the tyre grip drops below the driving force, the wheels accelerate uncontrolled until the clutch is closed. In snowy or muddy conditions, the tyres work themselves in a pit, so that the car can get stuck. With the transmission of the present invention, the wheels are speed controlled and can rotate at a given very low speed. When the tyre grip drops, the wheels remain rotating at the same low speed so that the tyres can regain grip on the ground. This ability is also very useful for off-highway vehicles or 4-wheel driven cars.

The simulated efficiency of the transmission itself is at low power levels around 99.4%. This figure includes mechanical and hydraulic losses. At full throttle acceleration, it reduces to 96-97%. Actual gearboxes have the highest efficiency at max torque, a situation which happens rarely in modern highly powered cars. The transmission of the present invention seems to have the highest efficiency at low power and zero or slow ratio change. Such driving conditions contribute most to the overall fuel consumption.

A consequence of the high efficiency is that no cooling system is needed or that a small cooler system is used only in rare conditions. A pump, cooler, fan, coolant and hydraulic controls only increase the cost and the weight and increase the risk of spoiling oil in the environment. On top, the power to drive the cooler pump further lowers the efficiency.

The simulation shows that the transmission ratio can change so fast (when the throttle is pushed suddenly) that the whole engine torque is consumed in acceleration of the engine itself. A faster ratio change does of course make no sense. This means that the engine power increases from almost zero to full power in 200 ms. (The simulations are done for a 300 HP, 400 Nm petrol engine with a rear wheel driven passenger car of 1800 kg).

In summary the total efficiency improvement is around 18 to 30%

15 to 20% from improved engine efficiency 2 to 7% from transmission efficiency of the present invention versus MT 1 to 3% from absence of clutch or torque converter A parking brake can be made easily when the transmission speed ratio is put in zero. (The output is thus standing still while the engine can rotate without delivering power.) When a mechanical device is applied as preload force (52), this force will be maintained also when the engine is cut. This way the transmission output cannot rotate, independent whether the engine is running or not.

Figure 11:
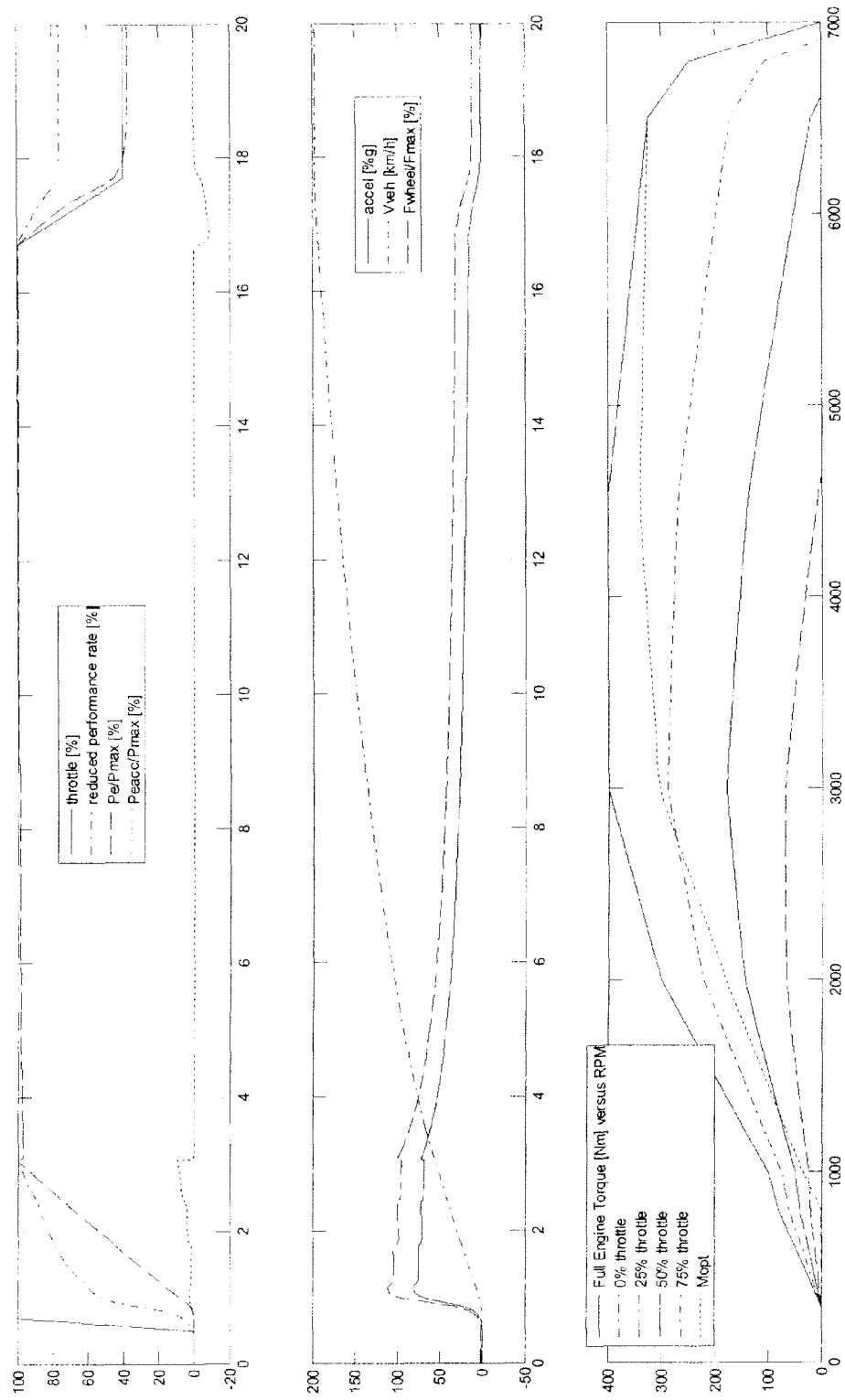
FIG. 11: Simulation results of a full throttle drive away from standstill
Figure 11:
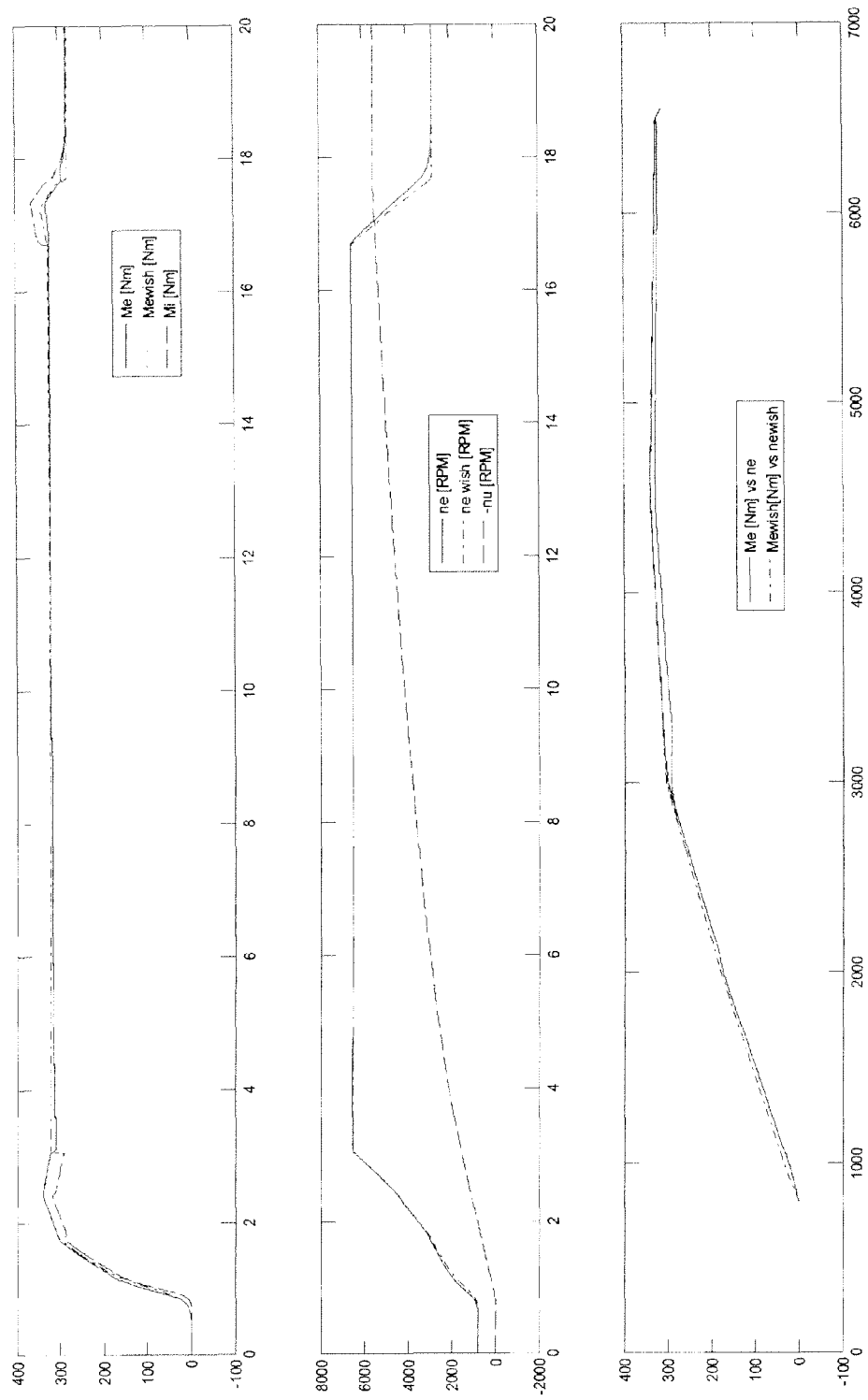

FIG. 11 illustrates a simulation of a drive away from standstill

Figure 12:
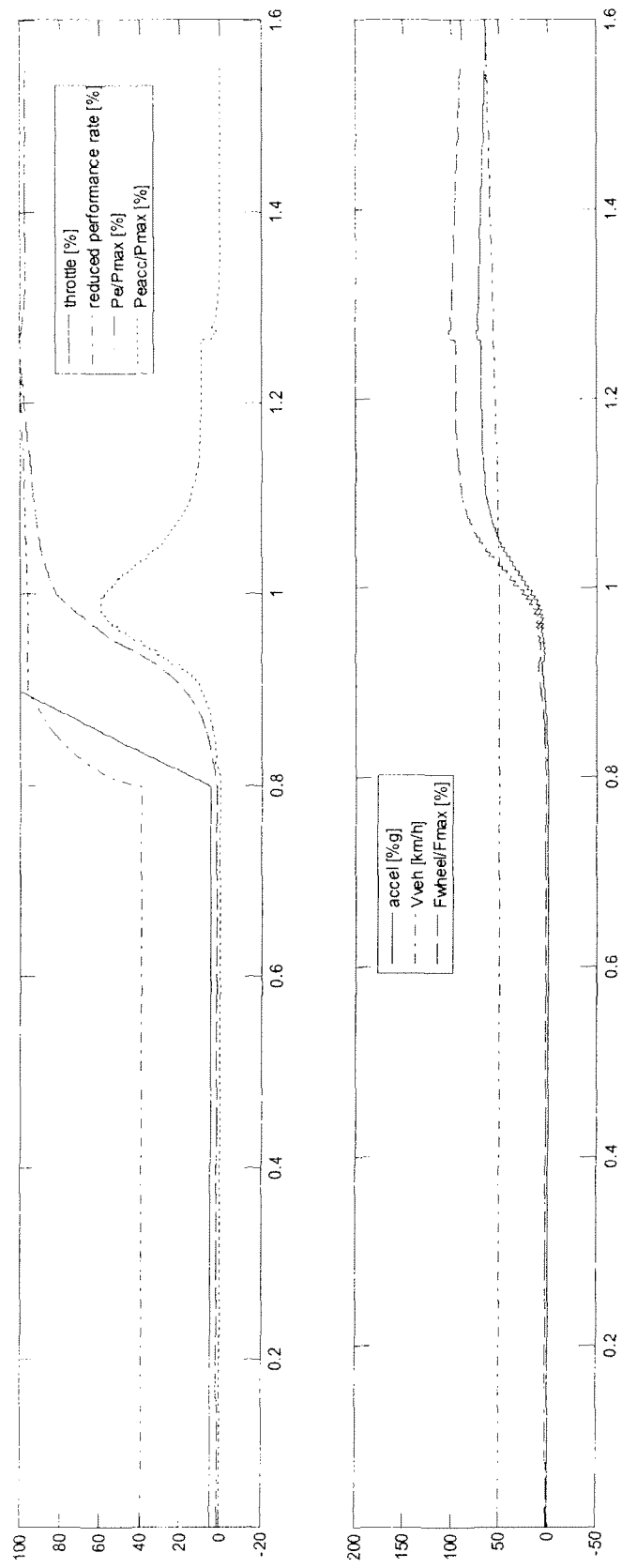
FIG. 12: Simulation results of driving constantly at 50 km/h and then a sudden acceleration with full throttle.
Figure 12:
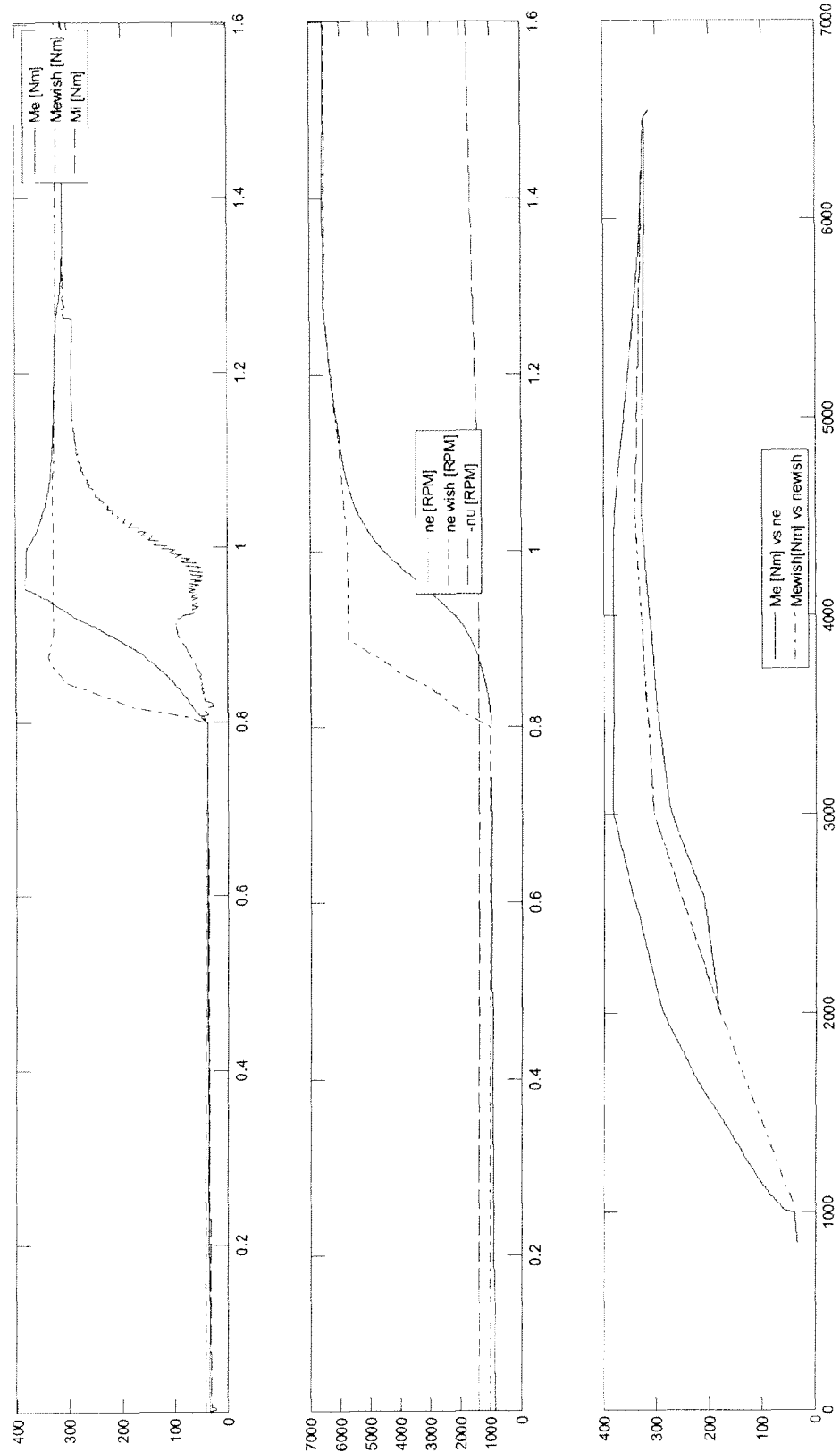
Figure 12:
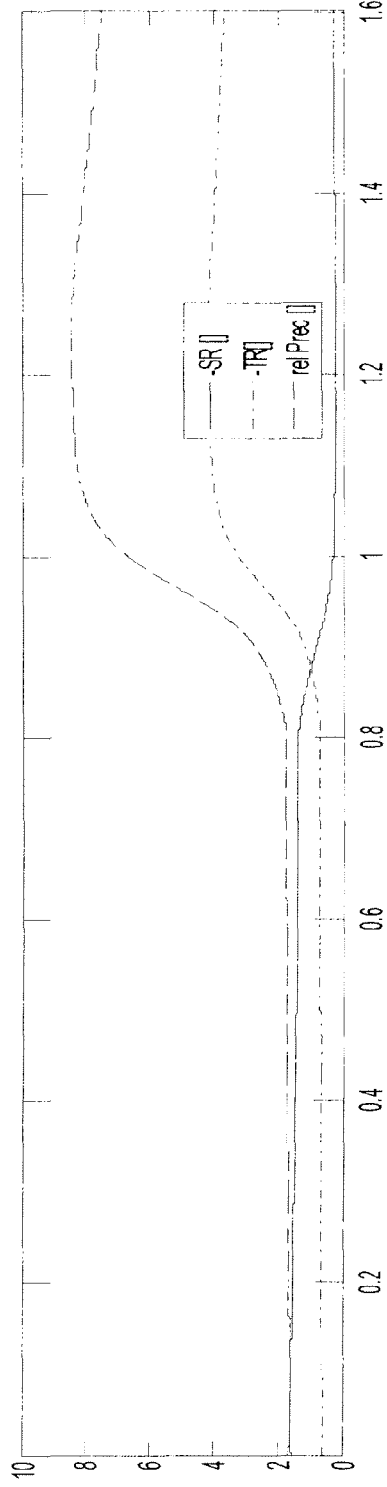
Figure 12:
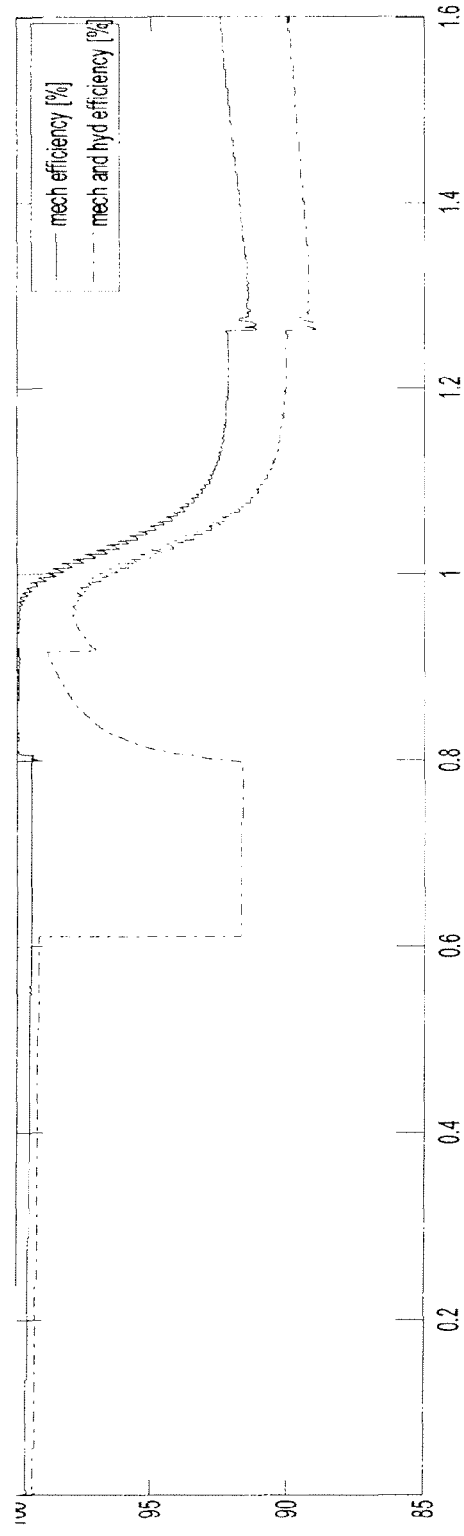

FIG. 12 simulates a sudden acceleration after driving at a constant speed of 50 km/h. It shows how fast the acceleration of the car is achieved.

Example 2

Hydraulic Controls

FIG. 5 shows a hydraulic method to generate the preload forces and the steering force, but these forces can also be created by pneumatic or mechanical means. A hydraulic controlled pressure is acting on the preload force piston (29) of the ring wheel (1a) of the primary Planetary Variator to create the Normal forces between the planets (2a, 2b) and the ring and sun wheels (1a, 1b, 3a, 3b). The preload force piston (29) and preload force cylinder (30) are not rotating. The Normal force on each contact surface must be large enough so that the longitudinal and the transverse creep in the contact zones remain in microslip. Permanently a much higher pressure than needed would shorten the life of the bearings and the contact surfaces.

The ratio is controlled by the Forward steering pressure pSF acting on the steering piston (28) in the Forward steering cylinder (26) and by the Reverse steering pressure pSR acting on the other side of the steering piston (28) in the Reverse steering cylinder (27). This steering piston (28) and the steering cylinders (26, 27) are rotating with input speed. Without steering pressure, the transmission ratio would go to speed ratio zero because the centrifugal forces on the planets (2a, 2b) pull the main shaft (12) in the position of speed ratio zero. The net steering force is controlled by the software. Fast downshifting (when driving forward) requires in most cases no hydraulic power from the steering pressure since the centrifugal forces on the planets (2a, 2b) generally are already strong enough to shift down only by diminishing the Forward steering pressure pSF. When the centrifugal forces are not sufficient, fast downshifting is assisted by the Reverse steering pressure pSR.

Example 3

Software Controls

As an example for an automotive application a software program is explained. In general the SW must control the preload force pressure and the steering pressures pSF and pSR. For safety and controllability reasons none of the sides of the steering piston (28) ever sees zero pressure but always minimum a bias pressure at one side. See 4.6.1. The inputs for the SW are the throttle position, requested driving sense, input speed, output speed and the engine torque and efficiency map. Possibly the position of the steering piston will be used as feedback signal.

From the throttle position the requested engine power level is known. It defines with the efficiency map the requested engine speed. With a PID (or PID$^2$) controller, the SW defines the first proposal for the speed of the steering piston (28) so that the engine speed changes towards the requested engine speed. More in detail the transmission computer calculates the preload force and the steering force in 5 steps in order to prevent that macroslip would occur in one of the rolling contacts and to avoid that the anti-spin control of the car would interfere too often.

Step 1:

At low car speed, the requested power will be limited by the known value of the tyre grip on dry concrete. With the requested engine power and with the fuel efficiency map of the engine the requested engine speed and torque are calculated. The PID controller defines then the speed vS of the steering piston (28). Then all geometrical parameters and all internal speeds (longitudinal and transverse on the rolling direction) are calculated. With the actual transmission input torque, the longitudinal forces in the rolling contacts are calculated.

Step 2:

Assume the preload pressure pN is max.

With the theory of microslip, the longitudinal creep is calculated. If all longitudinal creeps are in microslip, the controller goes to the next step; if not, the input torque must be reduced. (The latter should not occur, since it means that the transmission is under designed.)

Step 3:

The steering speed vS is already calculated by the controller; the preload pressure pN is assumed to be max.

With the known actual input torque and input speed, the longitudinal forces at the contact points are known. The steering speed vS defines also all transverse speeds in the rolling contacts. With the theory of microslip, with the known Normal forces and with the transverse speeds, the longitudinal microslip is defined. From the theory of microslip the transverse creep is also defined. Both creeps define the total creep.

If the total creep is within microslip the controller goes to the next step; if not, the steering speed vS must be diminished to the new steering speed vS.

Step 4:

With the actual suggestion of steering speed vS and the actual driving forces, it is possible to find the minimum preload pressure pN which results in microslips slightly below the microslip limit.

The right preload pressure pN is calculated. (With this calculation sequence, the preload pressure cannot exceed the maximum limit.) The steering piston position is known by the ratio of output to input speed (or directly from the position sensor). This position defines all geometrical conditions. Centrifugal forces are known from the input speed and driving forces are known from the engine (=input) speed and throttle position.

Also the steering pressure to obtain the steering speed vS is calculated. At each rolling contact point the transverse speed is known and with the theory of microslip the transverse forces are calculated. The resultant is the net steering force.

Step 5:

When the steering pressure is higher than the limit, the steering speed vS must be reduced and the controller goes back to step 1; if not, the preload pressure pN and the Forward steering pressure pSF are defined to stay within microslip and to use the engine as close as possible to its max efficiency point for the given (changing) power request.

Example 4

Hydraulic Systems

Hydraulic Supplies

A preferred hydraulic power supply is shown in FIG. 5

Safety

When only one proportional valve would be used for the forward steering pressure pSF and another one for the reverse steering pressure pSR, an unsafe condition could occur when, supposed that the car is driving forward, the proportional valve for pSF (33) fails to zero pressure. In this case the centrifugal forces would change the transmission ratio very fast to speed ratio zero so that the engine would overspeed and the wheels would block. To avoid these consequences, 2 safety shut off valves (36, 37) are added and the pressure reducing valves (props') (33, 34) put always minimum the bias pressure (i.e. 0.5 bar) on both sides of the steering piston (28). This bias pressure keeps the safety shut off valves (on-offs) (36, 37) open. When one prop (33 or 34) fails to zero pressure, the corresponding on-off (36 or resp. 37) drains the preload pressure pN and the transmission does not transmit any torque. The car will coast and the engine is saved by its own overspeed protection. The transmission is in this condition 'in neutral'. (Only in this emergency case bushing (17) will support the sun-ring wheel (3a, 1b).)

Hydraulic Power

During full throttle accelerations a high pressure (i.e. 20 to 50 bar) is needed with almost no flow. In this situation the needed hydraulic power is around 50 Watt, but during a fast ratio change, a high pressure and a high flow are needed simultaneously during a fraction of a second. The hydraulic peak power can rise close to 10 kW. When driving with constant speed and moderate engine power, the hydraulic pressures pN and pSF are low (around 10 bar) and the needed hydraulic power is less than 5 Watt.

In order to fulfill these requirements with an efficient power consumption and low cost, a solution with a low pressure accumulator (38) and a high pressure accumulator (39) is selected.

Hydraulic Scheme

The oil pump (40) with small displacement is engine driven. The hydraulic pump switch (41) is an on-off valve which selects whether the pump (40) supplies power to one of the accumulators (38 or 39) or it drains all pump flow back to the sump and thus consuming almost no power from the engine. The hydraulic feed switch (42) selects which accumulator to be filled. The high pressure accumulator (39) gets priority over the low pressure accumulator (38). The hydraulic accumulator switch (43) selects which accumulator is used as supply for the 3 props: the accumulator with the smallest pressure exceeding the maximum of the required pressures is used. Pressure sensors (44) monitoring the accumulator pressures are used as input information for the transmission controller. The pressures pN, pSF and pSR are controlled as described above in 4.4.

Example 5

Cooling and Filtering

The microslip at the rolling surfaces creates heat. At high engine power and high torque ratio more heat is created than what will be transferred to the surrounding gas or fluid. This excess of heat will rise the temperature of the planet, sun and ring wheels. At lower power levels or lower torque ratio the rotating components will cool down by convection to the ambient gas or fluid. Possibly cool fins on the planets and at the inside of the ring and sun wheel can be added to improve the heat transfer. This gas or fluid can be an inert gas to avoid corrosion of the steel parts, but it can also be normal air combined with a lubricant or a gas with a mist of a cooling fluid. Cool fins at the inside of the housing will transfer the heat of the internal gas or fluid to the housing. The housing itself, possibly equipped with cooling fins at the outside, will be cooled by the driving wind. In some applications or conditions, cooling by convection as described above can be insufficient. In that case a fan blowing the gas or a pump circulating the fluid will be added. Outside the housing the gas or fluid will be cooled. In the same circuit wear particles from the rolling surfaces will be collected in a filter.

Example 6

Alternative Transmission Designs

Figure 6:
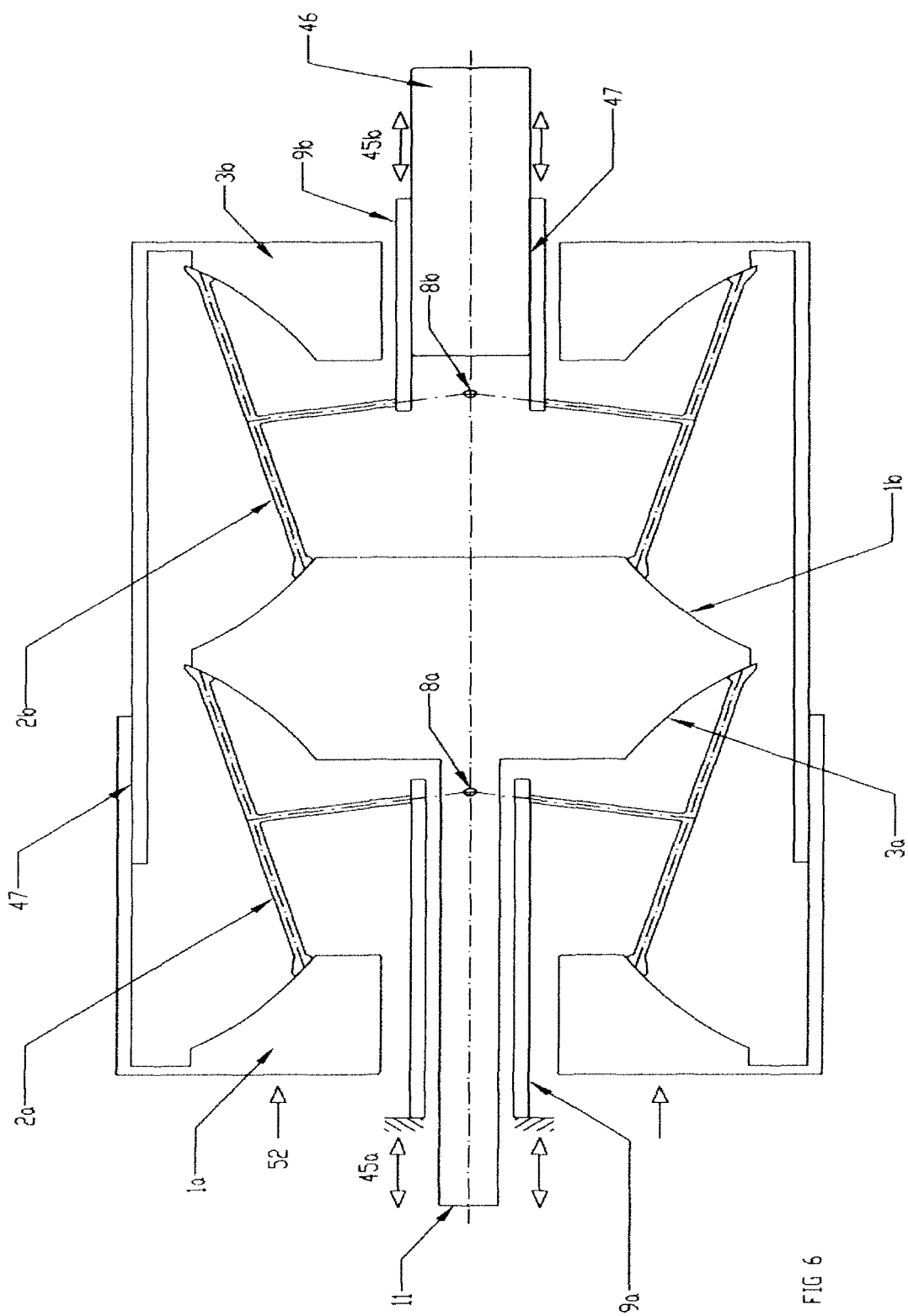
FIG. 6: Schematic representation of an alternative embodiment of the reversible variable transmission.

With the Planetary Variator different transmission layouts can be made by connecting the ring wheel 1, sun wheel 3 and central shaft 9 with other Planetary Variators or with other transmission components such as planetary gear systems or offset gears. Below some examples from the many different possibilities:

FIG. 6 shows an example of a reversible transmission, consisting of 2 Planetary Variators. 'Reversible' means a transmission that can vary not only continuously its ratio to zero output speed but also continuously the output rotation sense. With respect to the layout of FIG. 3 this alternative has the advantage that the planet wheels 5 and forks 4 of the primary Variator do not rotate around the central shaft 9a. This way, they are not subjected to high centrifugal forces. A disadvantage is that the highest speed ratio is lower than in the design of FIG. 3. The 2 central shafts 9 of the alternative design need to be moved axially by 2 steering pistons for instance to control the transmission ratio, while in the original design only 1 steering piston 28 is needed.

The input shaft 11 drives the primary sun wheel 3a and the secondary ring wheel 1b. The primary planets 2a are connected to the primary central shaft 9a with hinge pins 8 in the same way as in the original design. The primary central shaft 9a cannot rotate, but it can be moved axially by the steering forces 53a. These forces control the axial position of the central shaft 9a and thus also the transmission ratio. The primary ring wheel 1a is mechanically connected to the secondary sun wheel 3b via a torque transferring device 47. This torque transferring device 47 transmits torque between 2 components but allows an axial displacement between these components. It can be realized by a spline connection, but alternative mechanisms are possible. The secondary central shaft 9b is connected to the output shaft 46 with a similar torque transferring device 47. In a similar way this secondary central shaft 9b is positioned axially by steering forces 53b to obtain the required transmission ratio.

All contact surfaces of ring wheel 1, planets 2 and sun wheel 3 of the primary and secondary Planetary Variators are pressed against each other in order to transmit torque by friction. This is realized by only one preload force 52 acting over a bearing on the primary ring wheel 1a. The reaction force is transferred from the secondary sun wheel 3b over a bearing to the housing.

Figure 7:
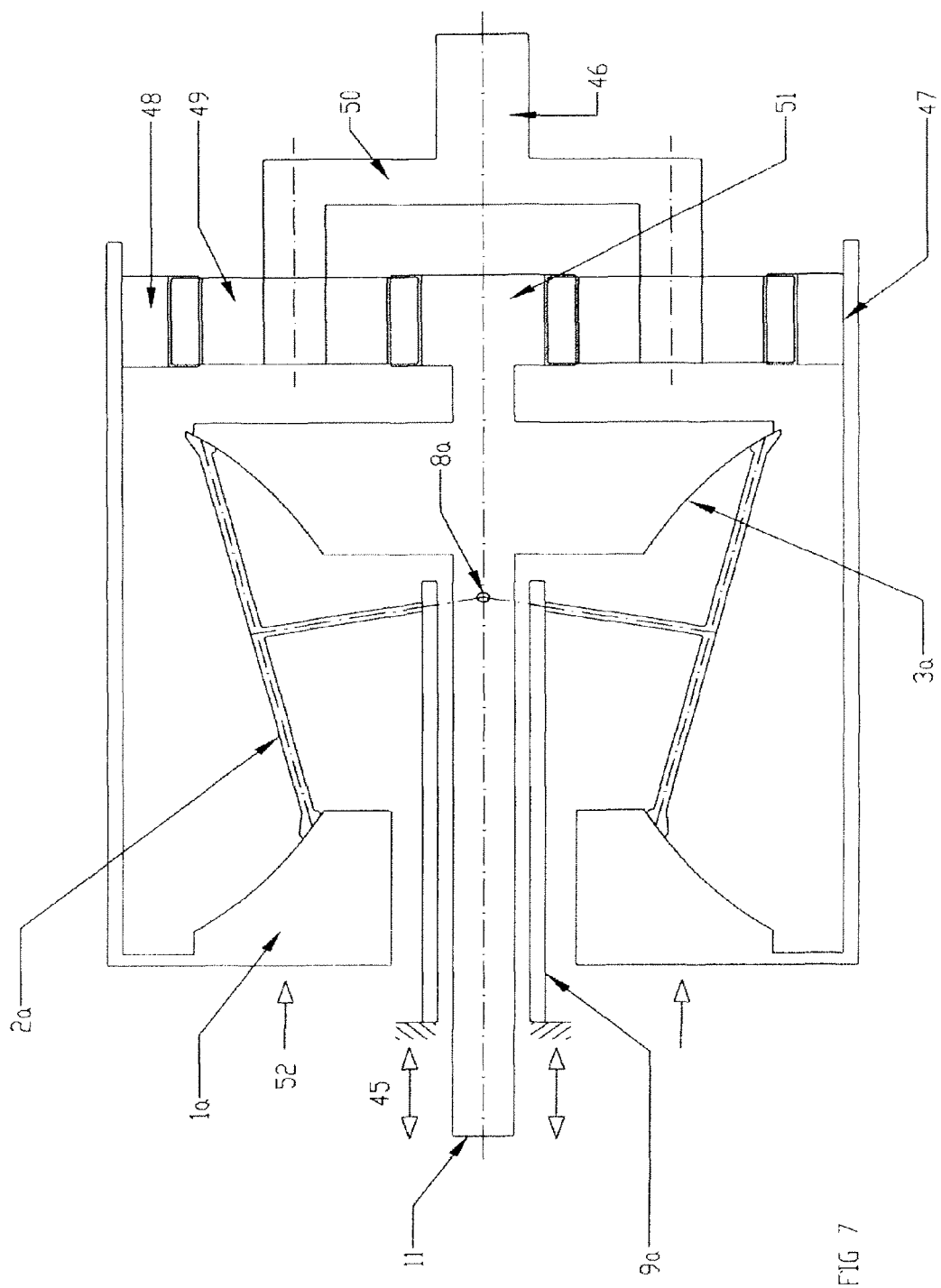
FIG. 7: Schematic representation of a further alternative embodiment of the reversible variable transmission.

FIG. 7 shows another alternative design of a reversible transmission. Here the secondary Planetary Variator is replaced by a conventional planetary gear system (with constant transmission ratio). In this design the central shaft 9a of the Planetary Variator is stationary and thus no centrifugal forces act on the bearings of the planets 2. De highest transmission ratio in both rotation senses of this design is of course lower than in the previous layout of FIG. 6.

The primary Planetary Variator is equal to the one of FIG. 6. In this case the primary ring wheel 1a is connected to the ring gear 48 over the torque transferring device 47. The sun wheel 3a is connected to the sun gear 51. Torque is transferred to the planetary gears 49 driving the planetary gear carrier 50 which is the transmission output. Between the Planetary Variator and the planetary gear system sealing is needed to avoid that the lube oil for the gear system can reach the interior of the Planetary Variator housing. Since this transmission is also "reversible", the output speed can vary continuously to zero and the rotation sense of the output can also change continuously.

Figure 8:
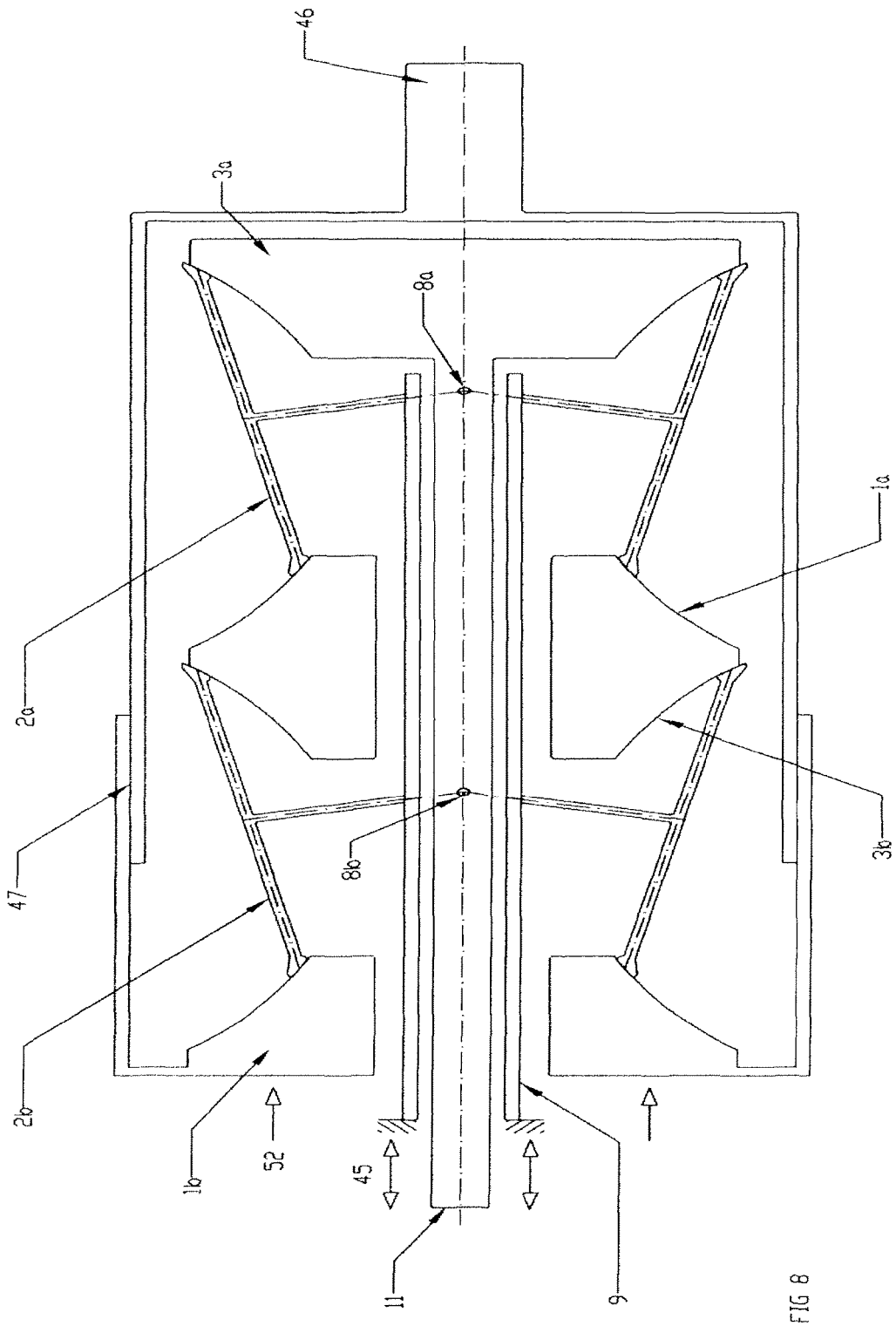
FIG. 8: Schematic representation of a further alternative embodiment of the reversible variable transmission.
Figure 9:
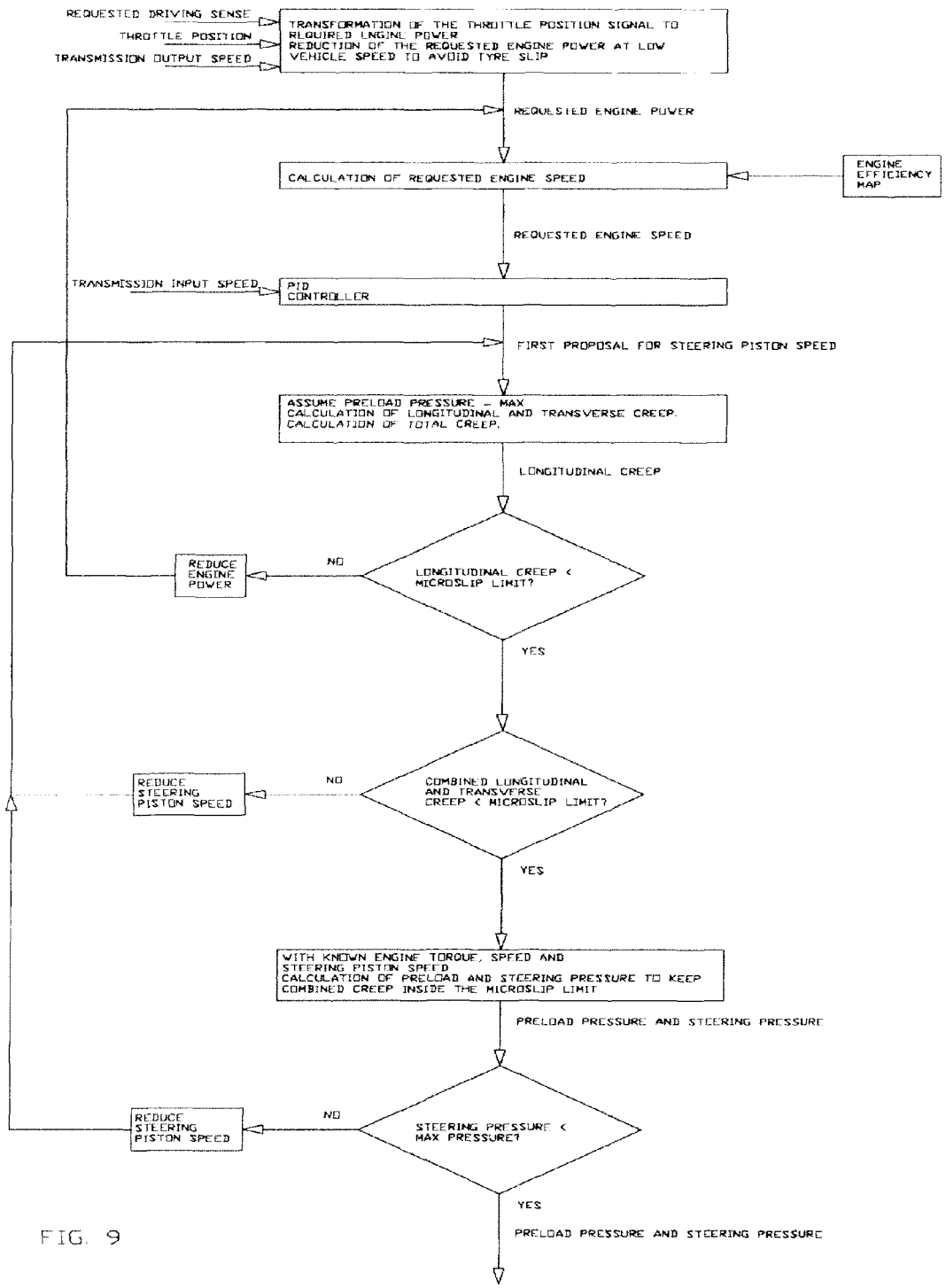
FIG. 9: Software block diagram of the software needed to steer the gearbox

A variable transmission with fixed output rotation sense is shown in FIG. 8. With this concept a random amount of Planetary Variators can be combined in order to obtain a large ratio spread. If the transmission ratio of 1 Planetary Variator varies from r to 1/r, then the total ratio spread for n Planetary Variators becomes $r^{(2n)}$(in absolute value). In the shown examples r equals about 2.

The input shaft 11 drives the primary sun wheel 3a. All central shafts 9 of each Planetary Variator are connected. The central shaft 9 cannot rotate but can be positioned by 1 axial steering force 45. All rolling contacts are pressed against each other by applying only one preload force 52 on the output ring wheel 1b over a bearing. The reaction force is transferred to the housing from the primary sun wheel 3a over a bearing. Because the central shafts 9 do not rotate, there are no centrifugal forces acting on the bearings of the planet wheels 2.

What is claimed is:

1. Planetary Variator, functioning as subsystem for variable or reversible transmissions, able to vary continuously the transmission ratio, characterized in that:

it consists of a ring wheel, two or more planets mounted around a central shaft and a sun wheel, so that the ring wheel, the central shaft and the sun wheel form an interface with other transmission components, the ring wheel is an axisymmetric body around the axis with a rolling surface shaped according to a tractrix curve, the sun wheel is the same as the ring wheel but the inner and outer diameter of the tractrix curve may differ from the diameters of the ring wheel, the planets consist of a planet wheel with basically a conical rolling surface, mounted freely rotational around a planet fork by means of radial and axial bearings or bushings and that the virtual top of the mentioned cone coincides with the intersection of the axis of the central shaft with the axis of a hinge connecting the planet to the central shaft, each planet fork of one Planetary Variator can rotate freely around a hinge joint of which the axis is perpendicular on the central shaft axis and parallel to the planet wheel plane and that each planet fork and each planet wheel is designed not to interfere with each other for all applicable inclination angles between the planet axis and the central shaft axis, the ring wheel, planets and sun wheel are squeezed against each other so that the rolling surfaces are in contact with each other and that the contact pressures are high enough to transmit the required torque, the central shaft is moved axially with a defined speed in relation to the squeezing force and transmitted torque, in order to change the transmission ratio, the tractrix curve of ring and sun wheel have both the same length parameter L as the length from the rolling contact point of the planet wheel to the intersection of the hinge axis with the central shaft axis, where L is used in the tractrix equation, $+/-x +c = L*(\cos \alpha + \ln |\tan(\alpha/2)|)$, with c an arbitrary constant and $\alpha$ the inclination angle between the tangent in the contact point and the axis of the central shaft, and in that the shape of the rolling surfaces of the planet wheels, which is basically conical, deviates slightly from this theoretical shape in a convex way in order to optimize the contact pressure distribution.

2. A reversible variable transmission, comprising a primary and a secondary Planetary Variator according to claim 1, characterized in that:

the ring wheel of the primary Planetary Variator is connected to a housing so that it cannot rotate but can move axially by a preload force compressing all rolling contacts of both Planetary Variators, the central shafts of both Planetary Variators are combined into 1 main shaft and rotationally connected to a transmission input shaft and axially movable by a steering force in both senses, while the input shaft does not move axially, the sun wheel of the primary Planetary Variator is connected to the ring wheel of the secondary Planetary Variator so that the combined ring-sun wheel can rotate around the central axis of the transmission, and in that the sun wheel of the secondary Planetary Variator is connected to an output shaft of the transmission and that the reaction force of the preload force is transferred to the housing over an axial bearing.

3. A planetary variator according to claim 1 or a reversible variable transmission according to claim 2, characterized in that:
the relative dimensions of the ring wheel, sun wheel and planets are chosen appropriate for a car application, meaning that the highest speed ratio is so high that an engine can deliver its power at its best efficiency curve when driving with zero or positive acceleration,
the relative dimensions of the ring wheel, sun wheel and planets are chosen appropriate for a car application, meaning that the highest speed ratio in reverse is high enough to drive the car with moderate engine speed and low noise in reverse, and
in that by moving the main shaft of the transmission, the transmission ratio varies continuously between the highest speed ratio in forward over standstill to the highest transmission ratio in reverse.

4. A reversible variable transmission according to claim 2, characterized in that:
the Normal force on each rolling contact is created by one preload force, acting from the housing on the not rotating primary ring wheel and that the reaction force is transferred over one bearing from the secondary sun wheel to the housing, and
in that net steering forces for defining the position of the main shaft and thus also for defining the transmission ratio, are created by one force in one of both senses and acting on the main shaft, and that said forces are transferred over a bearing to the housing.

5. A reversible variable transmission according to claim 4, characterized in that:
the preload force is created by one or more piston and cylinder system(s) between the housing and primary ring wheel and activated by a single pneumatic or hydraulic pressure or created by a mechanical preload system, where this mechanical system can also be used as a parking brake when the transmission is put in zero speed ratio,
the steering pressure is created by a hydraulic or pneumatic piston cylinder system, able to work in both senses, integrated in the input shaft and main shaft, and
in that the hydraulic or pneumatic pressure to create the steering pressure mentioned in claim 4 is sealed between the stationary housing and the rotating input shaft by piston rings or seals designed to seal parts rotating at different rotational speeds.

6. A Hydraulic system, intended to control a reversible variable transmission according to claim 2 in a car, truck or other on-highway or off-highway vehicle, characterized in that:
one engine driven pump is used to deliver the hydraulic pressure and flow,
a high and a low pressure accumulator are integrated in the system, wherein the fluid from the low pressure accumulator for pressurizing the preload piston and a steering piston is used with priority over the high pressure accumulator,
the high pressure accumulator is filled up by the pump with priority over the low pressure accumulator, and
in that pressure reducer valves are used to control the preload pressure and the steering pressures for forward and reverse driving sense.

7. A hydraulic safety feature for a hydraulic control system according to claim 6, characterized in that:
a safety feature is added by means of a shut off valve in the preload pressure line and that the shut off valve is switched by the forward steering pressure in order to drain the preload pressure immediately as soon as the active steering pressure drops below a certain bias pressure.

8. A hydraulic safety feature for a hydraulic control system according to claim 6, characterized in that:
a safety feature is added by means of two shut off valves in the preload pressure line and that one of the two shut off valves is switched by the forward steering pressure and the other of the two shut off valves is switched by the reverse steering pressure in order to drain the preload pressure immediately as soon as one of the active steering pressures drops below a certain bias pressure.

9. A software program intended to control a reversible variable transmission according to claim 2 with a hydraulic valve, characterized in that:
one engine driven pump is used to deliver the hydraulic pressure and flow,
a high and a low pressure accumulator are integrated in the system, wherein the fluid from the low pressure accumulator for pressurizing the preload piston and a steering piston is used with priority over the high pressure accumulator,
the high pressure accumulator is filled up by the pump with priority over the low pressure accumulator,
pressure reducer valves are used to control the preload pressure and the steering pressures for forward and reverse driving sense,
the curve of engine torque versus engine speed expressing minimal fuel consumption for every engine power level is stored in a controller's memory,
a PID controller defines the speed of the steering piston, connected to the main shaft, in order to get the engine speed equal to the required engine speed calculated from the curve of minimal fuel consumption,
the speed of the steering piston as proposed by the PID controller can be reduced to stay within the microslip range based on the calculation procedure, and
in that the preload pressure and the steering pressure determining the angle of the planets relative to the axis of the main shaft are defined to stay within longitudinal and transverse microslip.

10. The software program according to claim 9, characterized in that:
a safety feature is added by means of a shut off valve in the preload pressure line and that the shut off valve is switched by the forward steering pressure in order to drain the preload pressure immediately as soon as the active steering pressure drops below a certain bias pressure.

11. The software program according to claim 9, characterized in that:
a safety feature is added by means of two shut off valves in the preload pressure line and that one of the two shut off valves is switched by the forward steering pressure and the other of the two shut off valves is switched by the reverse steering pressure in order to drain the preload pressure immediately as soon as one of the active steering pressures drops below a certain bias pressure.

12. The Variable transmission according to claim 2, characterized in that:
a transmission interior, defined as the interior where the rolling contacts are moving, is filled with an inert gas, or normal air and a splashing fluid for cooling and lubrication, or a gas with a mist of a coolant, and in that this said interior is sealed from the lube oil for the bearings and from the exterior of the transmission.

13. The Planetary Variator according to claim 1 or the variable transmission according to claim 2, characterized in that:

the lubrication flow for bearings or bushings inside the planets is realized by a closed circuit for each planet and that optionally the oil is pumped around by vanes inside the planets, pumping outwards the oil, which is further guided through the bearings or bushings.

14. A method of transmitting power at variable speeds in a vehicle selected from the group consisting of car, truck, bus, off-road vehicle, mowing machine, wind turbine, telescopic boom handler, lift truck or any other industrial application in which power needs to be transmitted at variable speeds, wherein the vehicle comprises the reverse variable transmission of claim 2, comprising the step of:

transmitting power with the reversible variable transmission.

15. A combination of:

a reversible variable transmission system comprising a transmission of claim 2, a hydraulic system, intended to control a reversible variable transmission according to claim 2 in a car, truck or other on-highway or off-highway vehicle, characterized in that:

one engine driven pump is used to deliver the hydraulic pressure and flow, a high and a low pressure accumulator are integrated in the system, wherein the fluid from the low pressure accumulator for pressurizing the preload piston and a steering piston is used with priority over the high pressure accumulator, the high pressure accumulator is filled up by the pump with priority over the low pressure accumulator, pressure reducer valves are used to control the preload pressure and the steering pressures for forward and reverse driving sense, and a software program intended to control a reversible variable transmission according claim 2 with a hydraulic valve, characterized in that:

the curve of engine torque versus engine speed expressing minimal fuel consumption for every engine power level is stored in a controller's memory, a PID controller defines the speed of the steering piston, connected to the main shaft, in order to get the engine speed equal to the required engine speed calculated from the curve of minimal fuel consumption, the speed of the steering piston as proposed by the PID controller can be reduced to stay within the microslip range based on the calculation procedure, and in that the preload pressure and the steering pressure determining the angle of the planets relative to the axis of the main shaft are defined to stay within longitudinal and transverse microslip.

16. The combination according to claim 15, characterized in that:

a safety feature is added by means of a shut off valve in the preload pressure line and that the shut off valve is switched by the forward steering pressure in order to drain the preload pressure immediately as soon as the active steering pressure drops below a certain bias pressure.

17. The combination according to claim 15, characterized in that:

a safety feature is added by means of two shut off valves in the preload pressure line and that one of the two shut off valves is switched by the forward steering pressure and the other of the two shut off valves is switched by the reverse steering pressure in order to drain the preload pressure immediately as soon as one of the active steering pressures drops below a certain bias pressure.

18. The Planetary Variator according to claim 1 or the variable transmission according to claim 2, characterized in that:

an alternative lubrication flow for the bearings or bushings inside the planets is realized by integrating this oil flow in the main lube flow comprising all bearings of an input and an output shaft, wherein the flow is taken from the central shaft through one of the hinges, guided through the bearings of the planets and flowing back via another hinge into the central shaft.

19. The Planetary Variator according to claim 1 or the variable transmission according to claim 2, characterized in that:

bearings of the planets are lubricated with grease or that hybrid bearings are used which do not require any lubrication.

20. A combination of 1 or more Planetary Variators according to claim 1, in different variable transmission layouts, characterized in that:

the ring wheel, the central shaft and the sun wheel, can be connected to a transmission input, an output, a housing, an interface with another Planetary Variator or any other transmission component, wherein the expression 'reversible' means here a variable transmission of which the output rotation sense, relative to the input rotation sense, can be changed continuously and of which the speed ratio is defined even at very low and zero output speed, without slipping components as used in torque converters or friction disc clutches.

* * * * *